(12) United States Patent
Laroche et al.

(10) Patent No.: US 9,794,596 B2
(45) Date of Patent: Oct. 17, 2017

(54) METHOD AND DEVICE FOR OPTIMIZING ENCODING/DECODING OF COMPENSATION OFFSETS FOR A SET OF RECONSTRUCTED SAMPLES OF AN IMAGE

(71) Applicant: CANON KABUSHIKI KAISHA, Tokyo (JP)

(72) Inventors: Guillaume Laroche, Rennes (FR); Christophe Gisquet, Rennes (FR); Edouard Francois, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/808,753

(22) Filed: Jul. 24, 2015

(65) Prior Publication Data
US 2015/0334393 A1    Nov. 19, 2015

Related U.S. Application Data

(63) Continuation of application No. 14/356,842, filed as application No. PCT/EP2012/072071 on Nov. 7, 2012, now Pat. No. 9,118,931.

(30) Foreign Application Priority Data

Nov. 7, 2011  (GB) .................................. 1119206.9
Feb. 24, 2012 (GB) .................................. 1203285.0
Mar. 26, 2012 (GB) .................................. 1205304.7

(51) Int. Cl.
H04N 7/12       (2006.01)
H04N 11/02      (2006.01)
(Continued)

(52) U.S. Cl.
CPC .......... *H04N 19/85* (2014.11); *H04N 19/117* (2014.11); *H04N 19/13* (2014.11); *H04N 19/136* (2014.11);
(Continued)

(58) Field of Classification Search
None
See application file for complete search history.

(56) References Cited

U.S. PATENT DOCUMENTS 5,502,489 A      3/1996   Kim et al.
8,199,216 B2 *   6/2012   Hwang ................... H04N 1/58
                                                        348/223.1
(Continued)

FOREIGN PATENT DOCUMENTS

CN         101543076 A      9/2009
JP         2013-138395 A    7/2013
(Continued)

*Primary Examiner* — Talha M Nawaz
(74) *Attorney, Agent, or Firm* — Canon USA, Inc. I.P. Division

(57) ABSTRACT

The present invention provides a method and a device for coding and decoding at least a part of an image comprising a plurality of samples, each sample comprising at least two components, and the encoded image comprising at least one filtering parameter. The filtering comprises using at least one filtering parameter as a common filtering parameter for filtering both the first component and the second component of a reconstructed sample.

18 Claims, 23 Drawing Sheets

(51) Int. Cl.
*H04N 11/04* (2006.01)
*H04N 19/85* (2014.01)
*H04N 19/139* (2014.01)
*H04N 19/14* (2014.01)
*H04N 19/13* (2014.01)
*H04N 19/117* (2014.01)
*H04N 19/136* (2014.01)
*H04N 19/44* (2014.01)
*H04N 19/80* (2014.01)
*H04N 19/82* (2014.01)
*H04N 19/86* (2014.01)

(52) U.S. Cl.
CPC ........... *H04N 19/139* (2014.11); *H04N 19/14* (2014.11); *H04N 19/44* (2014.11); *H04N 19/80* (2014.11); *H04N 19/82* (2014.11); *H04N 19/86* (2014.11)

(56) References Cited

U.S. PATENT DOCUMENTS

| | | | |
|---|---|---|---|
| 2006/0232709 A1* | 10/2006 | Renner | H04N 5/21 348/607 |
| 2008/0137753 A1 | 6/2008 | He | |
| 2008/0202320 A1 | 8/2008 | Skowronek et al. | |
| 2009/0257664 A1 | 10/2009 | Kao et al. | |
| 2010/0046612 A1* | 2/2010 | Sun | H04N 19/149 375/340.02 |
| 2011/0026593 A1 | 2/2011 | New et al. | |
| 2011/0274158 A1 | 11/2011 | Fu et al. | |
| 2012/0027083 A1 | 2/2012 | Narroschke et al. | |
| 2012/0051425 A1 | 3/2012 | Chong et al. | |
| 2012/0177103 A1 | 7/2012 | Fu et al. | |
| 2012/0287988 A1 | 11/2012 | Chong et al. | |
| 2013/0051454 A1* | 2/2013 | Sze | H04N 19/70 375/240.02 |
| 2013/0223542 A1* | 8/2013 | Kim | H04N 19/00909 375/240.29 |
| 2014/0192861 A1* | 7/2014 | Chuang | H03M 7/4018 375/240.02 |

FOREIGN PATENT DOCUMENTS

| | | |
|---|---|---|
| JP | 2015-506603 A | 2/2015 |
| RU | 2072562 C1 | 1/1997 |
| RU | 2295203 C2 | 3/2007 |
| RU | 2355125 C1 | 5/2009 |
| RU | 2358319 C2 | 6/2009 |
| RU | 2406259 C2 | 12/2010 |
| RU | 2409008 C2 | 1/2011 |
| WO | 2010/113524 A1 | 10/2010 |

* cited by examiner

| Category | Signal type | Offset X | Offset Z |
|---|---|---|---|
| 1 | | $+O_{X1}$ | $+O_{X4}$ |
| 2 | | $+O_{X2}$ | $+O_{X3}$ |
| 3 | | $-O_{X3}$ | $-O_{X2}$ |
| 4 | | $-O_{X4}$ | $-O_{X1}$ |

Figure 17

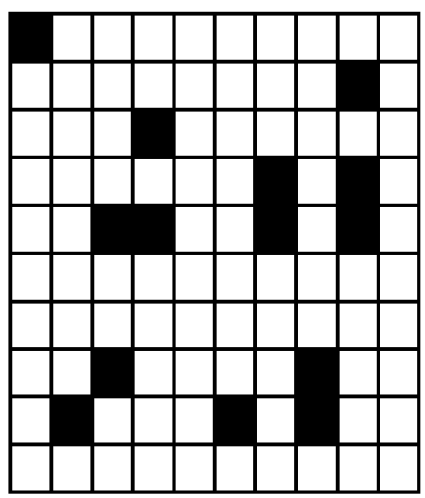
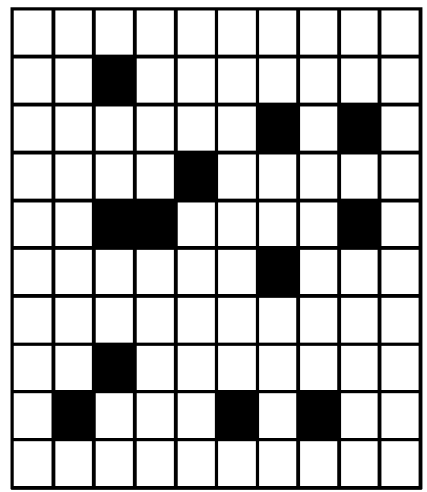
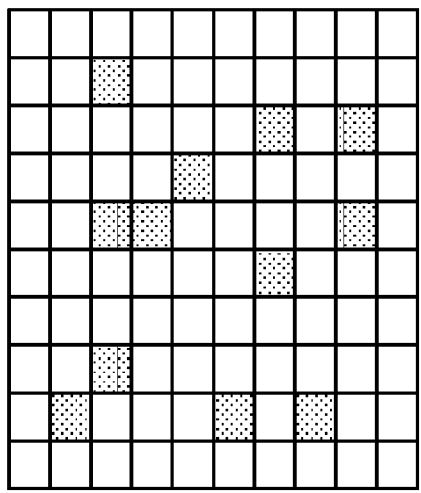
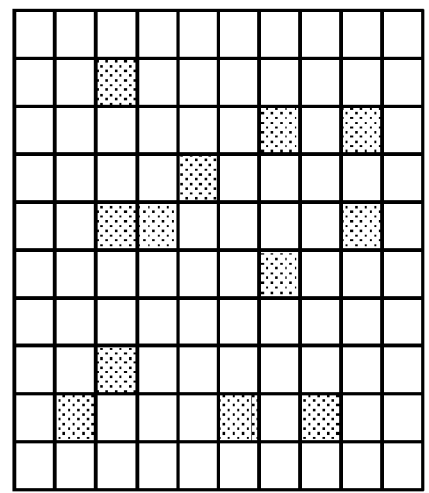
Figure 23

METHOD AND DEVICE FOR OPTIMIZING ENCODING/DECODING OF COMPENSATION OFFSETS FOR A SET OF RECONSTRUCTED SAMPLES OF AN IMAGE

CROSS-REFERENCE TO RELATED APPLICATIONS

This application is a continuation application of U.S. patent application Ser. No. 14/356,842 filed May 7, 2014, which is the National Phase application of PCT Application No. PCT/EP2012/072071, filed on Nov. 7, 2012 and titled "Method and device for optimizing encoding/decoding of compensation offsets for a set of reconstructed samples of an image." This application claims the benefit under 35 U.S.C. §119(a)-(d) of United Kingdom Patent Application Nos. GB1203285.0, filed on Feb. 24, 2012 and titled "Method and device for providing compensation offsets for a set of reconstructed samples of an image" and GB 1119206.9, filed on Nov. 7, 2011 and titled "Method and device for providing compensation offsets for a set of reconstructed samples of an image," and GB 1205304.7 filed on Mar. 26, 2012 and titled "Method and device for optimizing encoding/decoding of compensation offsets for a set of reconstructed samples of an image." The above cited patent applications are incorporated herein by reference in their entirety.

The present invention relates to a method and device for optimizing encoding and/or decoding of compensation offsets for a set of reconstructed samples of an image to improve the coding efficiency of a video codec and/or the decoding complexity. The invention further concerns a method and device for encoding or decoding a sequence of digital images.

The invention may be applied in the field of digital signal processing, and in particular in the field of video compression using motion compensation to reduce spatial and temporal redundancies in video streams.

Many video compression formats, such as for example H.263, H.264, MPEG-1, MPEG-2, MPEG-4, SVC, use block-based discrete cosine transform (DCT) and motion compensation to remove spatial and temporal redundancies. They are often referred to as predictive video formats. Each frame or image of the video signal is divided into slices which are encoded and can be decoded independently. A slice is typically a rectangular portion of the frame, or more generally, a portion of a frame or an entire frame. Further, each slice may be divided into macroblocks (MBs), and each macroblock is further divided into blocks, typically blocks of 64×64, 32×32, 16×16 or 8×8 pixels.

In High Efficiency Video Coding (HEVC) blocks of from 64×64, to 4×4 may be used. The partitioning is organized according to a quad-tree structure based on the largest coding unit (LCU). An LCU corresponds, for example, to a square block of 64×64. If an LCU needs to be divided, a split flag indicates that the LCU is split into 4 32×32 blocks. In the same way, if any of these 4 blocks need to be split, the split flag is set to true and the 32×32 block is divided into 4 16×16 blocks etc. When a split flag is set to false, the current block is a coding unit CU. A CU has a size equal to 64×64, 32×32, 16×16 or 8×8 pixels.

There are two families of coding modes for coding blocks of an image: coding modes based on spatial prediction, referred to as INTRA prediction and coding modes based on temporal prediction (INTER, Merge, Skip). In both spatial and temporal prediction modes, a residual is computed by subtracting the prediction from the original block.

An INTRA block is generally predicted by an INTRA prediction process from the encoded pixels at its causal boundary. In INTRA prediction, a prediction direction is encoded.

Temporal prediction consists in finding in a reference frame, either a previous or a future frame of the video sequence, an image portion or reference area which is the closest to the block to be encoded. This step is typically known as motion estimation. Next, the block to be encoded is predicted using the reference area in a step typically referred to as motion compensation—the difference between the block to be encoded and the reference portion is encoded, along with an item of motion information relative to the motion vector which indicates the reference area to use for motion compensation. In temporal prediction, at least one motion vector is encoded.

In order to further reduce the cost of encoding motion information, rather than directly encoding a motion vector, assuming that motion is homogeneous the motion vector may be encoded in terms of a difference between the motion vector and a motion vector predictor, typically computed from one or more motion vectors of the blocks surrounding the block to be encoded.

In H.264, for instance motion vectors are encoded with respect to a median predictor computed from the motion vectors situated in a causal neighbourhood of the block to be encoded, for example from the three blocks situated above and to the left of the block to be encoded. Only the difference, referred to as a residual motion vector, between the median predictor and the current block motion vector is encoded in the bitstream to reduce the encoding cost.

Encoding using residual motion vectors saves some bitrate, but necessitates that the decoder performs the same computation of the motion vector predictor in order to decode the value of the motion vector of a block to be decoded.

Both encoding and decoding processes may involve a decoding process of an encoded image. This process is typically performed at the encoder side for the purpose of future motion estimation which enables an encoder and a corresponding decoder to have the same reference frames.

To reconstruct the coded frame, the residual is inverse quantized and inverse transformed in order to provide the "decoded" residual in the pixel domain. The first reconstruction is then filtered by one or several kinds of post filtering processes. These post filters are applied on the reconstructed frame at encoder and decoder side in order that the same reference frame is used at both sides. The aim of this post filtering is to remove compression artifacts and improve image quality. For example, H.264/AVC uses a deblocking filter. This filter can remove blocking artifacts due to the DCT quantization of residual and to block motion compensation. In the current HEVC standard, 3 types of loop filters are used: deblocking filter, sample adaptive offset (SAO) and adaptive loop filter (ALF).

FIG. 1 is a flow chart illustrating steps of a loop filtering process of a known HEVC implementation. In an initial step 101, the encoder or decoder generates the reconstruction of the full frame. Next, in step 102 a deblocking filter is applied on this first reconstruction in order to generate a deblocked reconstruction 103. The aim of the deblocking filter is to remove block artifacts generated by residual quantization and block motion compensation or block Intra prediction. These artifacts are visually important at low bitrates. The deblocking filter operates to smooth the block boundaries according to the characteristics of two neighboring blocks. The encoding mode of each block, the quantization parameters used for the residual coding, and the neighboring pixel differences in the boundary are taken into account. The same criterion/classification is applied for all frames and no additional data is transmitted. The deblocking filter improves the visual quality of the current frame by removing blocking artifacts and it also improves the motion estimation and motion compensation for subsequent frames. Indeed, high frequencies of the block artifact are removed, and so these high frequencies do not need to be compensated for with the texture residual of the following frames.

After the deblocking filter, the deblocked reconstruction is filtered by a sample adaptive offset (SAO) loop filter in step 104. The resulting frame 105 is then filtered with an adaptive loop filter (ALF) in step 106 to generate the reconstructed frame 107 which will be displayed and used as a reference frame for the following Inter frames.

The aim of the SAO loop filter and the ALF is to improve frame reconstruction by sending additional data as opposed to a deblocking filter where no information is transmitted.

The principle of the SAO loop filter is to classify each pixel into a class and to add the same offset value to the respective pixel value of each pixel of the class. Thus one offset is transmitted for each class. SAO loop filtering provides two kinds of classification for a frame area: Edge offset and Band offset. Edge offset classification involves determining a class for each pixel by comparing its corresponding pixel value to the pixel values of two neighboring pixels. Moreover, the two neighboring pixels depend on a parameter which indicates the direction of the 2 neighboring pixels. These directions are a 0-degree (horizontal direction), a 45-degree (diagonal direction), a 90-degree (vertical direction) and a 135-degree (second diagonal direction). A direction to be used is given by an SAO parameter referred to as sao_type_idx in the current HEVC specifications. Its value typically varies from zero to five as shown in Table 1 of the Appendix. The sao_type_idx is also used to indicate whether or not SAO filtering is to be carried out and the type of SAO filtering.

For the sake of illustration, the offset to be added to a pixel value (or sample) C can be determined, for a given direction, according to the rules as stated in Table 2 of the Appendix wherein $Cn_1$ and $Cn_2$ designate the value of the two neighboring pixels or samples (according to the given direction). Accordingly, when the value C is less than the two values $Cn_1$ and $Cn_2$, the offset to be added to C is $+O_1$, when it is less than $Cn_1$ or $Cn_2$ and equal to the other value ($Cn_1$ or $Cn_2$), the offset to be used is $+O_2$, when it is greater than $Cn_1$ or $Cn_2$ and equal to the other value ($Cn_1$ or $Cn_2$), the offset to be used is $-O_3$, and when it is greater than $Cn_1$ and $Cn_2$, the offset to be used is $-O_4$. When none of these conditions are met, no offset value is added to the current pixel value C.

It is to be noted that according to the Edge Offset mode, only the absolute value of each offset is encoded in the bitstream, the sign to be applied being determined as a function of the category to which the current pixel belongs. Therefore, according to Table 2 of the Appendix, a positive offset is associated with the categories 1 and 2 while a negative offset is associated with categories 3 and 4.

The second type of classification is a Band offset classification which depends on the pixel value. A class in an SAO Band offset corresponds to a range of pixel values. Thus, the same offset is added to all pixels having a pixel value within a given range of pixel values.

In order to be more adaptive to the frame content, SAO filtering is applied on several frame areas which divide the current frame into several spatial regions. Currently, frame areas correspond to a finite number of the Largest Coding Unit in HEVC. Consequently, one frame area may or may not be filtered by SAO such that only some frame areas are filtered. Moreover, when SAO is enabled, only one SAO classification is used: Edge offset or Band offset according to the related parameters transmitted for each classification. Finally, for each SAO leaf node, the SAO classification as well as its parameters and the offsets of all classes are transmitted.

An image of video data to be encoded may be provided as a set of two-dimensional arrays (also known as colour channels) of sample values, each entry of which represents the intensity of a colour component such as a measure of luminance intensity and chrominance intensity from neutral grayscale colour toward blue or red (YUV) or as a measure of red, green, or blue light component intensity (RGB). A YUV model defines a colour space in terms of one luma (Y) and two chrominance (UV) components. Generally, Y stands for the luminance component and U and V are the chrominance (colour) or chroma components.

SAO filtering is typically applied independently on Luma and on both U and V Chroma components.

A known implementation of SAO Band offset splits the range of pixel values into 32 predefined ranges of the same size as depicted in FIG. 2. The minimum value of the range of pixel values is always zero and the maximum value depends on the bit-depth of the pixel values according to the following relationship $Max=2^{Bitdepth}-1$.

Splitting the full range of pixel values into 32 ranges enables the use of five bits for classifying each pixel, allowing a fast classification. Accordingly only 5 bits are checked to classify a pixel in one of the 32 classes or ranges of the full range. This is generally done by checking the five most significant bits of values encoded on 8 bits.

For example, when the bit-depth is 8 bits, the maximum possible value of a pixel is 255. Thus, the range of pixel values is between 0 and 255. For this bit-depth of 8 bits, each class includes a range of 8 pixel values.

The aim of the SAO band filtering is the filtering of pixels belonging to a group of four consecutive classes or ranges that is determined by the first class or band. The latter is transmitted in the bitstream so that the decoder can determine the four consecutive classes or ranges of the pixels to be filtered. The parameter representing this position is referred to as sao_band_position in the current HEVC specifications.

For the sake of illustration, a group of four consecutive classes or ranges 201 to 204 of pixels to be filtered is represented in FIG. 2 as a grey area. As described above, this group can be identified by its position (e.g. sao_band_position). According to the given example, class or range 201 relates to pixels having values comprised between 64 and 71. Similarly, classes or ranges 202 to 204 relate to pixels having values comprised between 72 and 79, 80 and 87, 88 and 96, respectively.

FIG. 3 is a flow chart illustrating steps of a method for selecting offsets in an encoder for a current frame area 303 (typically an LCU block corresponding to one component of the processed image). The frame area contains N pixels. In an initial step 301, the variables $Sum_j$ and $SumNbPix_j$ are set to a value of zero for each of the four ranges. j denotes the current range or class number. $Sum_j$ denotes the sum of the difference between the value of the pixels in the range j and the value of their corresponding original pixels. $SumNbPix_j$ denotes the number of pixels in the range j.

In step 302, the counter variable i is set to the value zero. Next, the first pixel Pi of the frame area 303 is extracted in step 304 and the class number J corresponding to the current pixel Pi is obtained in step 305. Next, a test is performed in step 306 to determine whether or not the class number J of the current pixel Pi corresponds to the value "N.A." as described above by reference to Table 2 of the Appendix. If the class number J of the current pixel Pi corresponds to the value "N.A.", the value of counter variable i is incremented by one in order to classify subsequent pixels of the frame area 303. Otherwise, if the class number J of the current pixel Pi does not correspond to the value "N.A.", the SumNbPix$_j$ variable corresponding to the current pixel Pi is incremented by one and the difference between $P_i$ and its original value $P_i^{org}$ is added to Sum$_j$ in step 307.

In the following step, the counter variable i is incremented by one in order to apply the classification to the other pixels of the frame area 303. In step 309 it is determined whether or not all the N pixels of the frame area 303 have been classified (i.e. is i≥=N), if yes, an Offset$_j$ for each class is computed in step 310 in order to produce an offset table 311 presenting an offset for each class j as the final result of the offset selection algorithm. This offset is computed as the average of the difference between the pixel values of the pixels of class j and their respective original pixel values. The, Offset$_j$ for class j is given by the following equation:

$$Offset_j = \frac{Sum_j}{SumNbPix_j}$$

The computed offset Offset$_j$ can be considered as an optimal offset in terms of distortion. It is referred to as Oopt$_j$ in the following. From this offset, it is possible to determine an improved offset value O_RD$_j$ according to a rate distortion criterion.

FIG. 4 is a flow chart illustrating steps of a method for determining an improved offset according to a rate distortion criterion. In an initial step 401, a rate distortion value $J_j$ of the current range or class number j is initialized to a predetermined maximum possible value (MAX_VALUE).

Next, a loop is launched at step 402 to make offset O$_j$ vary from Oopt$_j$ to zero. If value Oopt$_j$ is negative, variable O$_j$ is incremented by one until it reaches zero and if value Oopt$_j$ is positive, variable O$_j$ is decremented by one until it reaches zero.

In step 403, the rate distortion cost related to variable O$_j$, denoted J(O$_j$), is computed, for example according to the following formula:

$$J(O_j) = SumNbPix_j \times O_j \times O_j - Sum_j \times O_j \times 2 + \lambda R(O_j)$$

λ is the Lagrange parameter and R(O$_j$) is a function which provides the number of bits needed for the codeword associated with O$_j$. The part of the formula corresponding to SumNbPix$_j$×O$_j$×O$_j$−Sum$_j$×O$_j$×2 relates to the improvement in terms of distortion given by the offset O$_j$.

In step 404, the values J(O$_j$) and J$_j$ are compared each other. If the value J(O$_j$) is less than the value J$_j$ then J$_j$ is set to the value of J(O$_j$) and O_RD$_j$ set to the value of O$_j$.

In step 405 it is determined whether or not all the possible values of the offset O$_j$ have been processed (i.e. is O$_j$=0). If offset O$_j$ is equal to zero the loop is ended and an improved offset value (O_RD$_j$) for the class j has been identified. Otherwise, the loop continues with the next O$_j$ value.

It is noted that the algorithm described by reference to FIG. 3 can be used to determine a position of a first class or range (sao_band_position) according to a Band offset classification type. To that end, index j represents a value of the interval [0, 32] (instead of [1, 4]). In other words, the value 4 is replaced by the value 32 in modules 301, 310, and 311 of FIG. 3.

More specifically, the difference Sum$_j$ between the value of the current pixel and its original value Porg$_i$ can be computed for each of the 32 classes represented in FIG. 2, that is to say for each range j (j belonging to the interval [0, 32]).

Next, an improved offset O_RD$_j$, in terms of rate distortion, can be computed for the 32 classes according to an algorithm similar to the one described by reference to FIG. 4.

Next, the position of the first class or range can be determined.

FIG. 5 is a flow chart illustrating steps of a method for determining an SAO band position for SAO Band offset of HEVC. Since these steps are carried out after the ones described by reference to FIG. 4, the rate distortion value denoted J$_j$ has already been computed for each class j.

In an initial step 501, the rate distortion value J is initialized to a predetermined maximum possible value (MAX_VALUE). Next, a loop is launched at step 502 to make index i vary from zero to 27, corresponding to the 28 possible positions of the first class of the group of four consecutive classes.

In step 503, the variable J'$_j$ corresponding to the rate distortion value of the current band, that is to say the band comprising four consecutive classes from the class having the index i, is initialized to zero. Next, a loop is launched at step 504 to make index j vary from i to i+3, corresponding to the 4 classes of the current band.

Next, in step 505, the value of the variable J'$_i$ is incremented by the value of the rate distortion value of the class having index j (J$_j$). This step is repeated for the four classes of the current band, that is to say until index j reaches i+3 (step 506). In step 507, a test is performed to determine whether or not the rate distortion value J'$_j$ of the current band is less than the rate distortion value J. If the rate distortion value J'$_j$ of the current band is less than the rate distortion value J, the rate distortion value J is set to the value of the rate distortion of the current band and the band position value denoted sao_band_position is set to the value of the index i.

These steps are repeated for the 28 possible positions of the first class of the group of four consecutive classes (step 508) to determine the band position to be used.

FIG. 6 is a flow chart illustrating steps of a method for filtering a frame area, typically an LCU block corresponding to one component of a processed image, according to an SAO loop filter.

Such an algorithm is generally implemented in the decoder to decode frames and in the encoder to generate reference frames that are used for motion estimation and compensation of following frames.

In an initial step 601, SAO filtering parameters are obtained, for example from a received bitstream. For a given frame area, these parameters typically comprise four offsets that can be stored in table 603 and a parameter of the sao_type_idx. Depending on the latter, these parameters may further comprise an SAO band position. For the sake of illustration, if an obtained parameter of the sao_type_idx type is equal to five, the corresponding parameter of the sao_band_position type is then obtained (602). Other parameters as the ones allowing to determine the value of an SAO parameter of a given frame area as a function of the value of the corresponding parameter of a previous frame area can be obtained. It is to be noted that a given value of a given SAO parameter, such as the value zero for the sao_type_idx parameter may indicate that a SAO filtering is not to be applied.

In step 604, the counter variable i is set to the value zero. Next, the first pixel $P_i$ of the frame area 605, comprising N pixels, is extracted at step 606 and classified at step 607 according to the Edge offset classification or Band offset classification as described previously.

In step 608 a test is performed to determine whether or not pixel $P_i$ belongs to a class of pixels to be filtered. If pixel $P_i$ belongs to a class of pixels to be filtered, its related class number j is identified and its related offset value $Offset_j$ is obtained at step 610 from the offsets table 603. Next, in step 611, $Offset_j$ is added to the value of pixel $P_i$ in order to produce a new pixel value referred to as $P'_i$ (612). In step 613, pixel $P'_i$ replaces pixel Pi in the processed frame area 616. Otherwise, if pixel $P_i$ does not belong to a class of pixels to be filtered, pixel $P_i$ 609 remains unchanged in frame area at step 613.

Next, after having processed pixel $P_i$, counter variable i is incremented by one at step 614 in order to apply the filter similarly to the next pixel of the current frame area 605.

In step 615 it is determined whether or not all the N pixels of the current frame area 605 have been processed (i≥N). If yes, the processed frame area 616 is reconstructed and can be added to the SAO reconstructed frame as described above by reference to FIG. 1 (reference 105).

A drawback of the known process for selection and transmission of compensations is that it a great number of parameters have to be transmitted from the encoder to the decoder and stored in an SAO buffer. Moreover, the process carried out by the decoder for decoding and processing these parameters is complex.

The present invention has been devised to address one or more of the foregoing concerns.

According to a first aspect of the present invention there is provided a method of encoding at least a part of an image comprising a plurality of samples, each sample comprising at least two components, the encoded image comprising at least one filtering parameter, the method comprising
  encoding a first and a second component of at least one sample of the image to provide at least one encoded sample;
  decoding the at least one encoded sample;
  computing the at least one filtering parameter as a function of the difference between at least one component of the at least one sample of the image and the at least one corresponding component of the at least one corresponding decoded sample, the at least one filtering parameter being computed so as to be used in a loop filter as a common filtering parameter for filtering both the first and second components of a decoded sample.

By taking into account the interdependencies between components, the invention makes it possible to improve the coding efficiency of SAO, to reduce the memory buffer needed to store SAO parameters, and to reduce the complexity of the classification.

According to a second aspect of the present invention there is provided a method of decoding at least a part of an image comprising a plurality of samples, each sample comprising at least two components, the encoded image comprising at least one filtering parameter, the method comprising
  decoding a first and a second component of at least one encoded sample to provide a first and a second component of at least one reconstructed sample;
  decoding the at least one filtering parameter;
  filtering the at least one reconstructed sample in a loop filter, the filtering comprising using at least one decoded filtering parameter as a common filtering parameter for filtering both the first component and the second component of the at least one reconstructed sample.

According to a third aspect of the present invention there is provided an encoding device for encoding at least a part of an image comprising a plurality of samples, each sample comprising at least two components, the encoded image comprising at least one filtering parameter, the encoding device comprising
  means for encoding a first and a second component of at least one sample of the image to provide at least one encoded sample;
  means for decoding the at least one encoded sample;
  means for computing the at least one filtering parameter as a function of the difference between at least one component of the at least one sample of the image and the at least one corresponding component of the at least one corresponding decoded sample, the at least one filtering parameter being computed so as to be used in a loop filter as a common filtering parameter for filtering both the first and second components of a decoded sample.

According to a fourth aspect of the present invention there is provided a decoding device for decoding at least a part of an image comprising a plurality of samples, each sample comprising at least two components, the encoded image comprising at least one filtering parameter, the decoding device comprising
  means for decoding a first and a second component of at least one encoded sample to provide a first and a second component of at least one reconstructed sample;
  means for decoding the at least one filtering parameter;
  means for filtering the at least one reconstructed sample in a loop filter, the filtering comprising using at least one decoded filtering parameter as a common filtering parameter for filtering both the first component and the second component of the at least one reconstructed sample.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Thus, according to a fifth aspect of the present invention there is provided a computer program product for a programmable apparatus, the computer program product comprising a sequence of instructions for implementing each step of a method embodying the aforesaid first or second aspect of the present invention when loaded into and executed by the programmable apparatus.

Similarly, according to a sixth aspect of the present invention there is provided a computer-readable storage medium storing instructions of a computer program for implementing each step of a method embodying the aforesaid first or second aspect of the present invention.

Embodiments of the invention will now be described, by way of example only, and with reference to the following drawings in which:

FIG. 1 is a flow chart illustrating steps of a loop filtering process of the prior art;

FIG. 2 graphically illustrates a sample adaptive Band offset classification of an HEVC process of the prior art;

FIG. 17 illustrates a particular embodiment according to which the values of the offsets associated with a component correspond to the mirrored values of the offsets associated with a second component;

Figure 19:
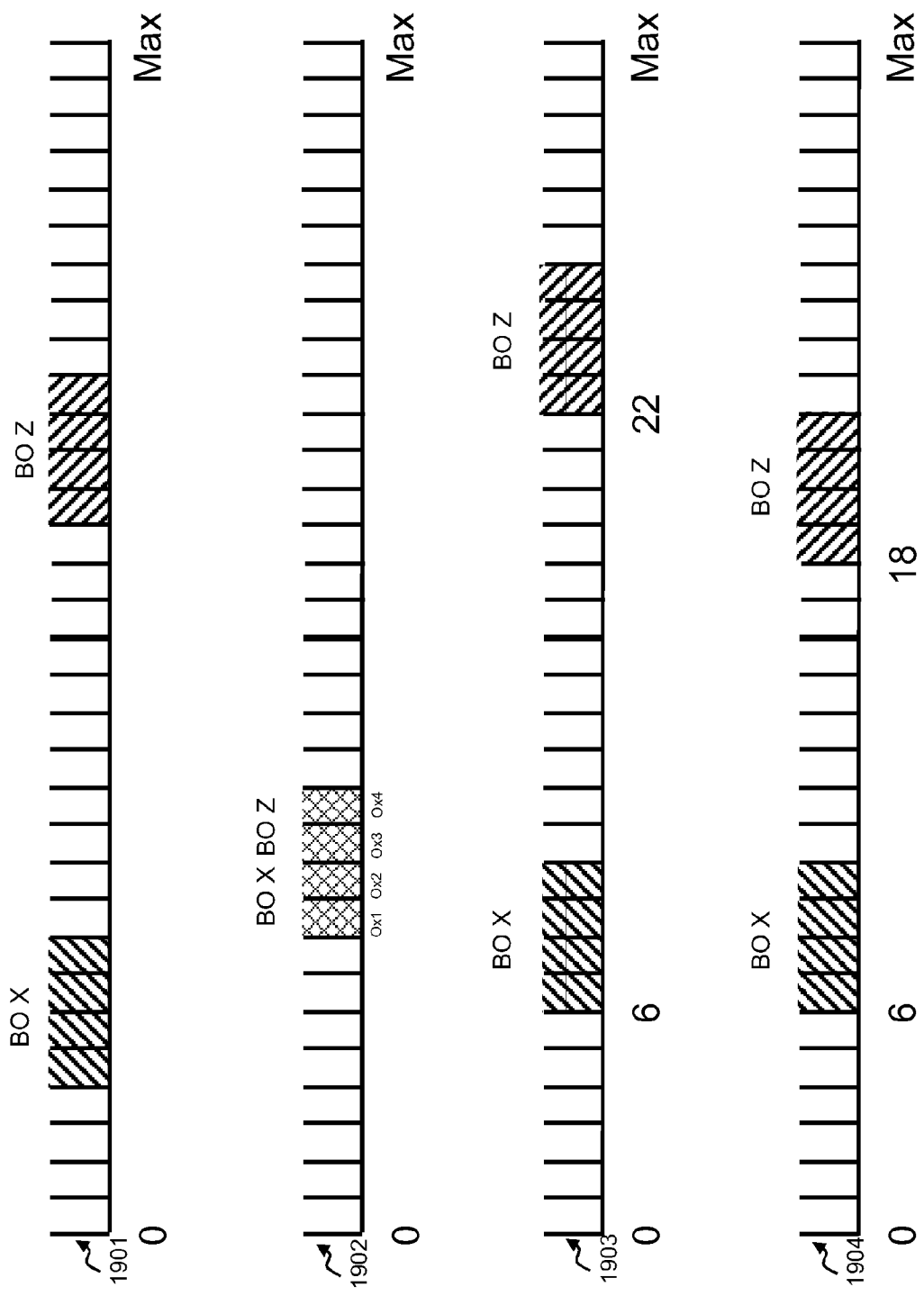
Figure 20:
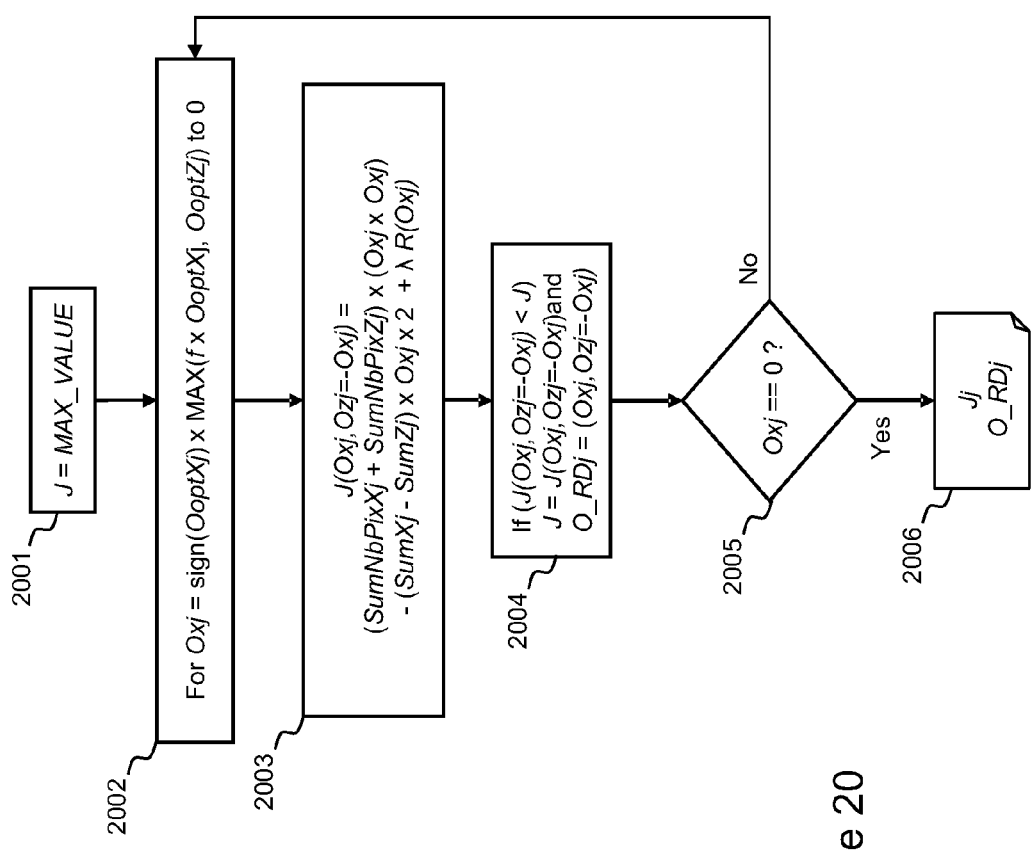
Figure 21:
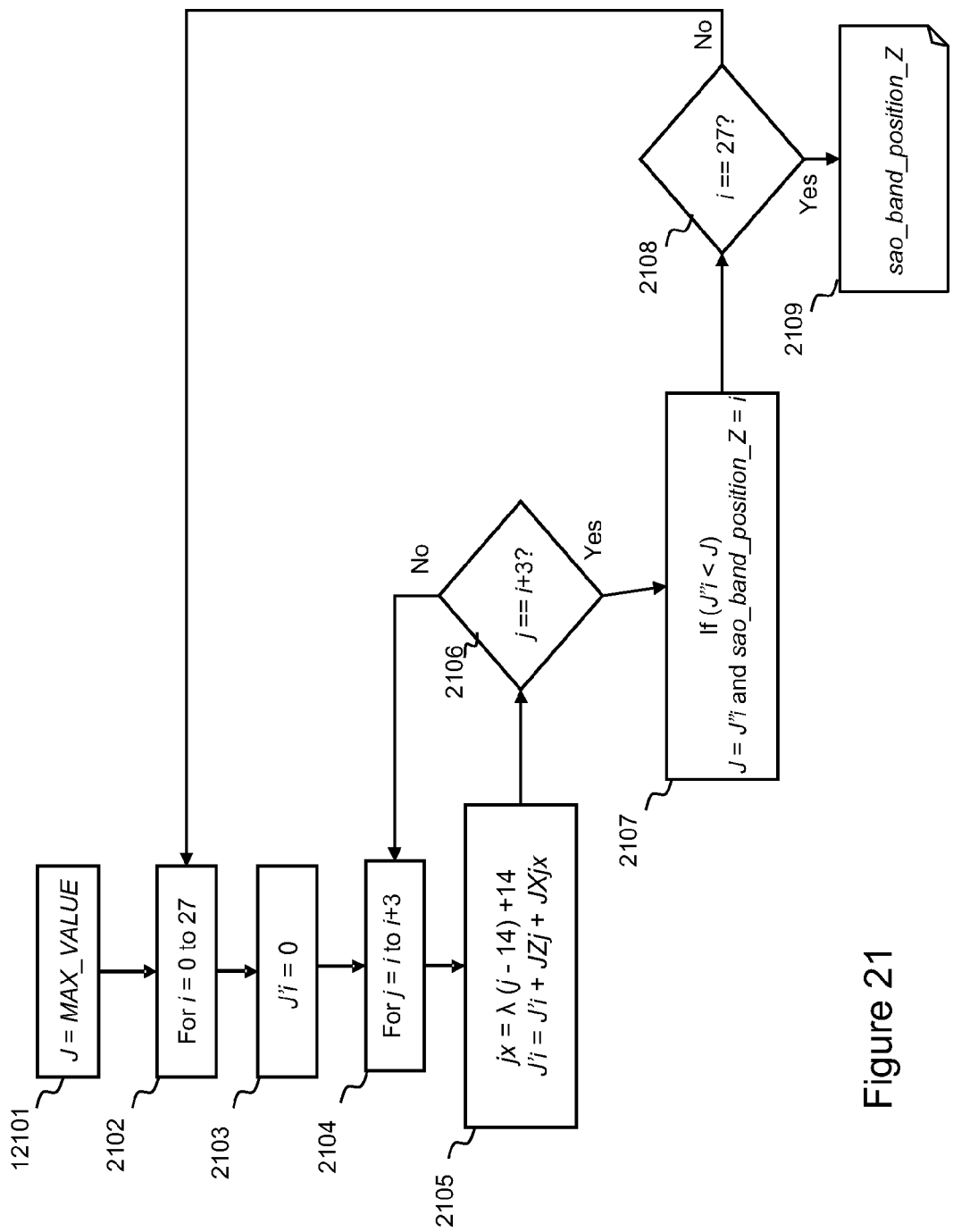
Figure 22:
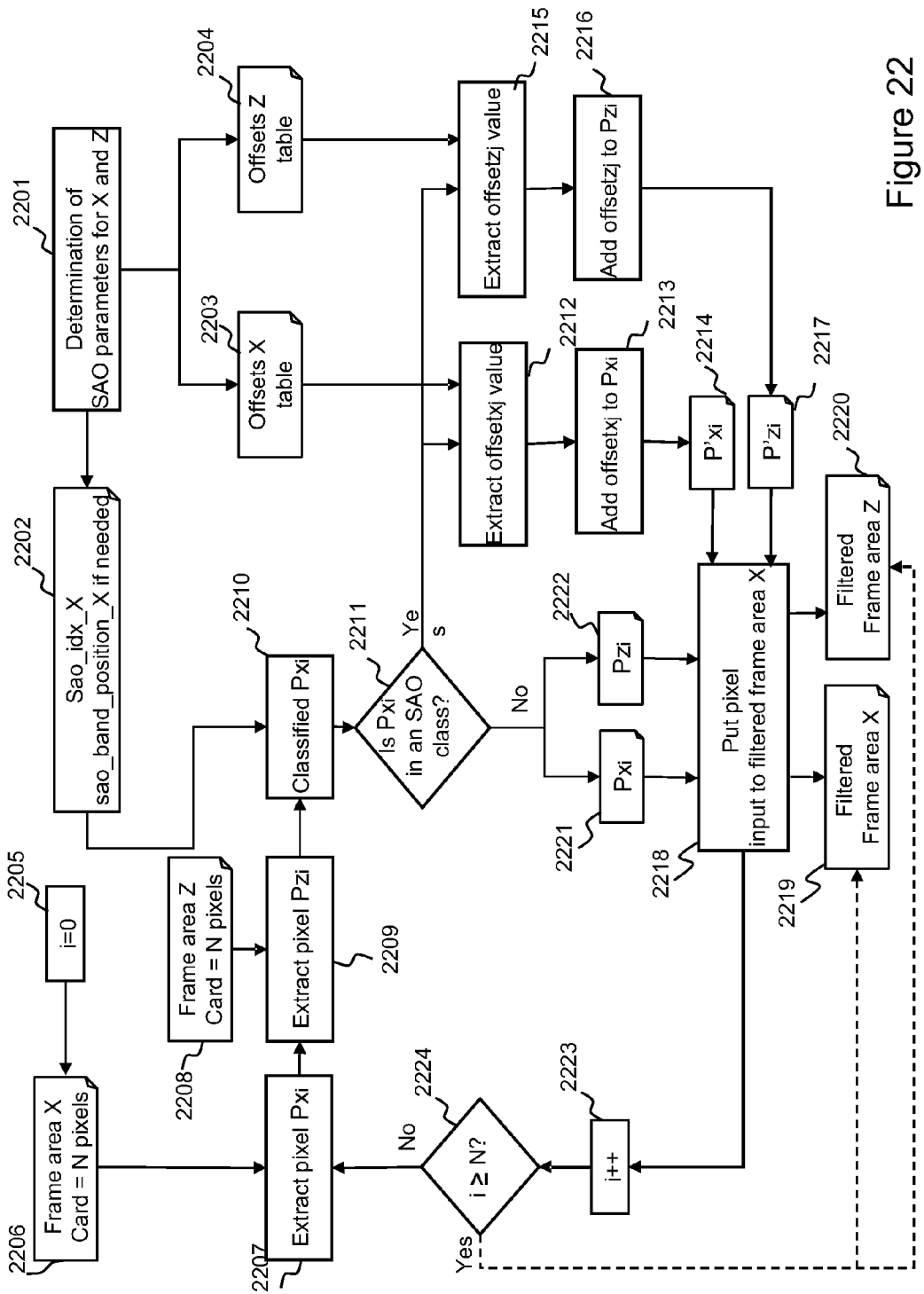

FIG. 19 illustrates how a value of the sao_band_position parameter associated with a second component Z can be obtained from the value of the sao_band_position parameter associated with a first component X when applying an SAO loop filter using a Band offset classification FIG. 20 is a flow chart illustrating steps of a method for determining an optimal offset to be used by two or three components according to a rate distortion criterion;

FIG. 21 is a flow chart illustrating steps of a method for determining an SAO band position shared between two components;

FIG. 22 is a flow chart illustrating steps of a method for decoding a bitstream according to a particular embodiment of the invention; and FIG. 23 illustrates the use of SAO classification of one component X to similarly filter another component Z.

Figure 7:
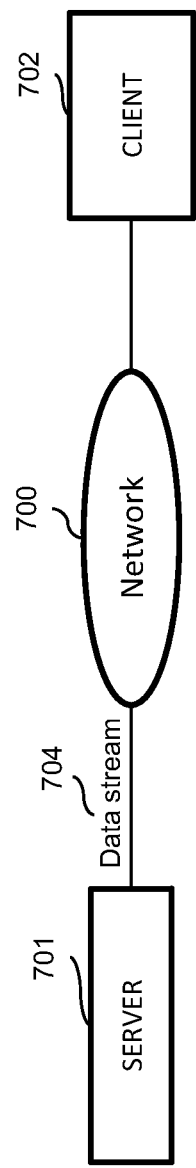
FIG. 7 is a block diagram schematically illustrating a data communication system in which one or more embodiments of the invention may be implemented.

FIG. 7 illustrates a data communication system in which one or more embodiments of the invention may be implemented. The data communication system comprises a transmission device, in this case a server 701, which is operable to transmit data packets of a data stream to a receiving device, in this case a client terminal 702, via a data communication network 700. The data communication network 700 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 701 sends the same data content to multiple clients.

The data stream 704 provided by the server 701 may be composed of multimedia data representing video and audio data. Audio and video data streams may, in some embodiments of the invention, be captured by the server 701 using a microphone and a camera respectively. In some embodiments data streams may be stored on the server 701 or received by the server 701 from another data provider, or generated at the server 701. The server 701 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format.

The client 702 receives the transmitted bitstream and decodes the reconstructed bitstream to reproduce video images on a display device and the audio data by a loudspeaker.

Although a streaming scenario is considered in the example of FIG. 7, it will be appreciated that in some embodiments of the invention the data communication between an encoder and a decoder may be performed using for example a media storage device such as an optical disc.

In one or more embodiments of the invention a video image is transmitted with data representing of compensation offsets for application to reconstructed pixels of the image to provide filtered pixels in a final image.

Figure 8:
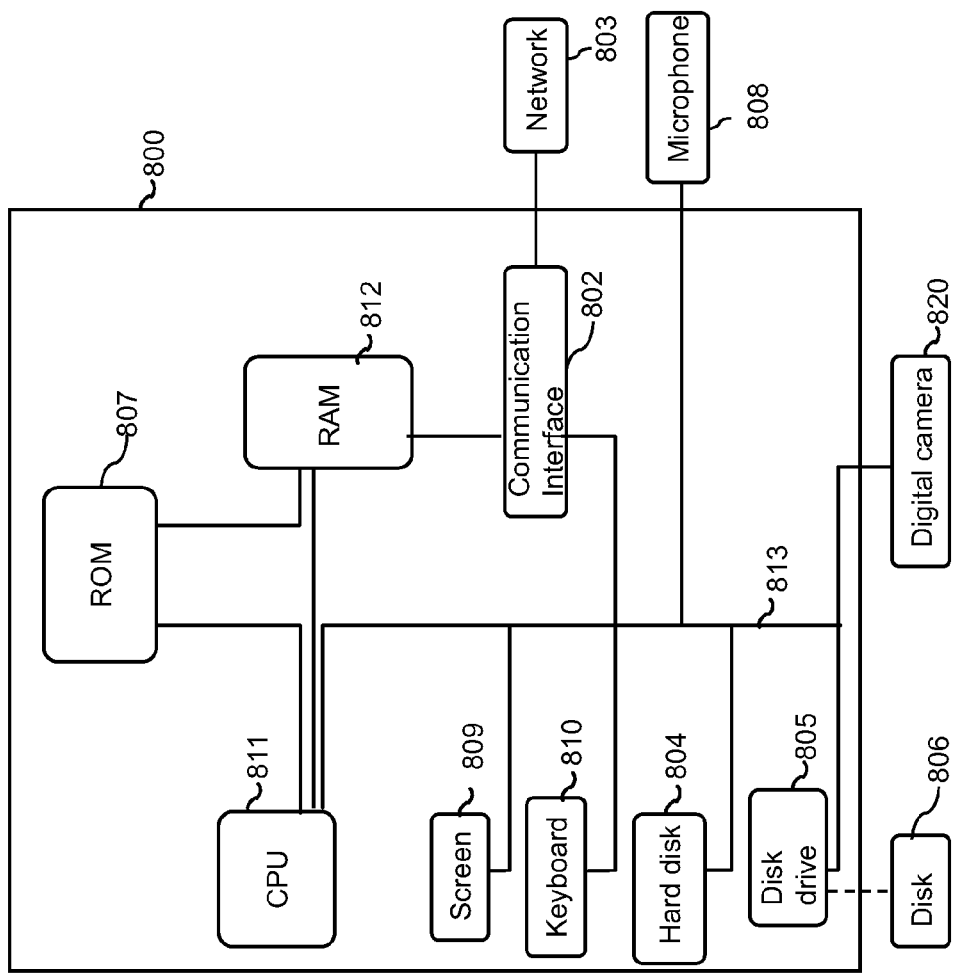
FIG. 8 is a block diagram illustrating components of a processing device in which one or more embodiments of the invention may be implemented.

FIG. 8 schematically illustrates a processing device 800 configured to implement at least one embodiment of the present invention. The processing device 800 may be a device such as a micro-computer, a workstation or a light portable device. The device 800 comprises a communication bus 813 connected to:

a central processing unit 811, such as a microprocessor, denoted CPU;

a read only memory 807, denoted ROM, for storing computer programs for implementing the invention;

a random access memory 812, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and a communication interface 802 connected to a communication network 803 over which digital data to be processed are transmitted or received Optionally, the apparatus 800 may also include the following components:

a data storage means 804 such as a hard disk, for storing computer programs for implementing methods of one or more embodiments of the invention and data used or produced during the implementation of one or more embodiments of the invention;

a disk drive 805 for a disk 806, the disk drive being adapted to read data from the disk 806 or to write data onto said disk;

a screen 809 for displaying data and/or serving as a graphical interface with the user, by means of a keyboard 810 or any other pointing means.

The apparatus 800 can be connected to various peripherals, such as for example a digital camera 820 or a microphone 808, each being connected to an input/output card (not shown) so as to supply multimedia data to the apparatus 800.

The communication bus provides communication and interoperability between the various elements included in the apparatus 800 or connected to it. The representation of the bus is not limiting and in particular the central processing unit is operable to communicate instructions to any element of the apparatus 800 directly or by means of another element of the apparatus 800.

The disk 806 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 807, on the hard disk 804 or on a removable digital medium such as for example a disk 806 as described previously. According to a variant, the executable code of the programs can be received by means of the communication network 803, via the interface 802, in order to be stored in one of the storage means of the apparatus 800 before being executed, such as the hard disk 804.

The central processing unit 811 is adapted to control and direct the execution of the instructions or portions of software code of the program or programs according to the invention, instructions that are stored in one of the aforementioned storage means. On powering up, the program or programs that are stored in a non-volatile memory, for example on the hard disk 804 or in the read only memory 807, are transferred into the random access memory 812, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 9:
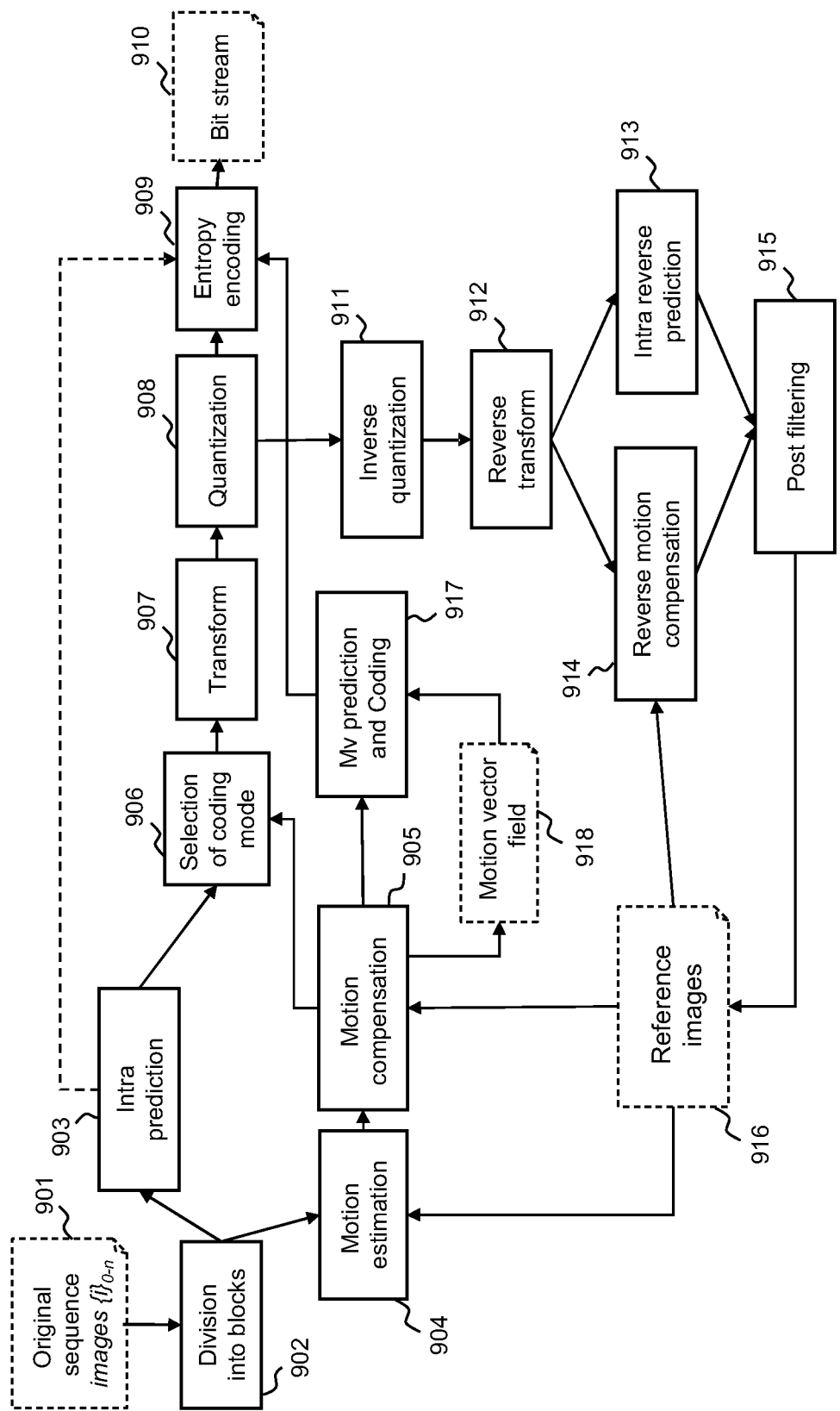
FIG. 9 is a flow chart illustrating steps of an encoding method according to embodiments of the invention.

FIG. 9 illustrates a block diagram of an encoder 900 according to at least one embodiment of the invention. The encoder is represented by connected modules, each module being adapted to implement, for example in the form of programming instructions to be executed by the CPU 811 of device 800, at least one corresponding step of a method implementing at least one embodiment of encoding an image of a sequence of images according to one or more embodiments of the invention.

An original sequence of digital images i0 to in 901 is received as an input by the encoder 900. Each digital image is represented by a set of samples, known as pixels.

A bitstream 910 is output by the encoder 900 after implementation of the encoding process. The bitstream 910 comprises a plurality of encoding units or slices, each slice comprising a slice header for transmitting encoding values of encoding parameters used to encode the slice and a slice body, comprising encoded video data.

The input digital images i0 to in 901 are divided into blocks of pixels by module 902. The blocks correspond to image portions and may be of variable sizes (e.g. 4×4, 8×8, 16×16, 32×32, 64×64 pixels). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 903 implements an Intra prediction process, in which the given block to be encoded is predicted by a predictor computed from pixels of the neighborhood of said block to be encoded. An indication of the selected Intra predictor and the difference between the given block and its predictor is encoded to provide a residual if the Intra coding is selected.

Temporal prediction is implemented by motion estimation module 904 and motion compensation module 905. Firstly a reference image from among a set of reference images 916 is selected, and a portion of the reference image, also called reference area or image portion, which is the closest area to the given block to be encoded, is selected by the motion estimation module 904. Motion compensation module 905 then predicts the block to be encoded using the selected area. The difference between the selected reference area and the given block, also called a residual block, is computed by the motion compensation module 905. The selected reference area is indicated by a motion vector.

Thus in both cases (spatial and temporal prediction), a residual is computed by subtracting the prediction from the original block.

In the INTRA prediction implemented by module 903, a prediction direction is encoded. In the temporal prediction, at least one motion vector is encoded.

Information relative to the motion vector and the residual block is encoded if the Inter prediction is selected. To further reduce the bitrate, assuming that motion is homogeneous, the motion vector is encoded by difference with respect to a motion vector predictor. Motion vector predictors of a set of motion information predictors are obtained from the motion vectors field 918 by a motion vector prediction and coding module 917.

The encoder 900 further comprises a selection module 906 for selection of the coding mode by applying an encoding cost criterion, such as a rate-distortion criterion. In order to further reduce redundancies a transform (such as DCT) is applied by transform module 907 to the residual block, the transformed data obtained is then quantized by quantization module 908 and entropy encoded by entropy encoding module 909. Finally, the encoded residual block of the current block being encoded is inserted into the bitstream 910.

The encoder 900 also performs decoding of the encoded image in order to produce a reference image for the motion estimation of the subsequent images. This enables the encoder and the decoder receiving the bitstream to have the same reference frames. The inverse quantization module 911 performs inverse quantization of the quantized data, followed by an inverse transform by reverse transform module 912. The reverse intra prediction module 913 uses the prediction information to determine which predictor to use for a given block and the reverse motion compensation module 914 actually adds the residual obtained by module 912 to the reference area obtained from the set of reference images 916.

Figure 10:
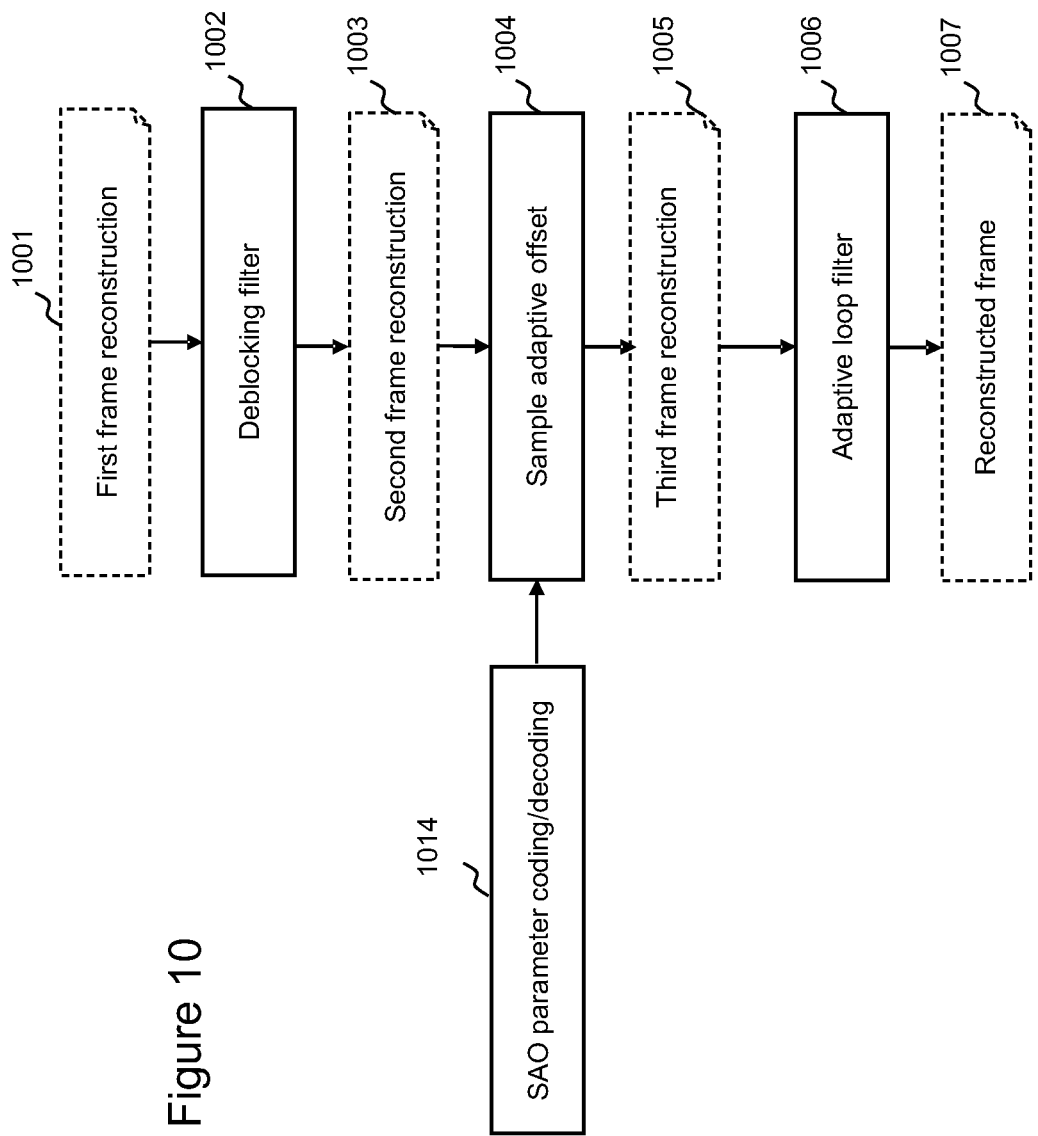
FIG. 10 is a flow chart illustrating steps of a loop filtering process in accordance with one or more embodiments of the invention.

Post filtering is then applied by module 915 to filter the reconstructed frame of pixels. In the embodiments of the invention an SAO loop filter is used in which compensation offsets are added to the pixel values of the reconstructed pixels of the reconstructed image FIG. 10 is a flow chart illustrating steps of loop filtering process according to at least one embodiment of the invention. In an initial step 1001, the encoder generates the reconstruction of the full frame. Next, in step 1002 a deblocking filter is applied on this first reconstruction in order to generate a deblocked reconstruction 1003. The aim of the deblocking filter is to remove block artifacts generated by residual quantization and block motion compensation or block Intra prediction. These artifacts are visually important at low bitrates. The deblocking filter operates to smooth the block boundaries according to the characteristics of two neighboring blocks. The encoding mode of each block, the quantization parameters used for the residual coding, and the neighboring pixel differences in the boundary are taken into account. The same criterion/classification is applied for all frames and no additional data is transmitted. The deblocking filter improves the visual quality of the current frame by removing blocking artifacts and it also improves the motion estimation and motion compensation for subsequent frames. Indeed, high frequencies of the block artifact are removed, and so these high frequencies do not need to be compensated for with the texture residual of the following frames.

After the deblocking filter, the deblocked reconstruction is filtered by a sample adaptive offset (SAO) loop filter in step 1004 based on a classification of pixels. The resulting frame 1005 may then be filtered with an adaptive loop filter (ALF) in step 1006 to generate the reconstructed frame 1007 which will be displayed and used as a reference frame for the following Inter frames.

In step 1004 each pixel of the frame area is classified into a class of the determined classification according to its pixel value. A class corresponds to a determined range of pixel values. The same compensation offset value is added to the pixel value of all pixels having a pixel value within the given range of pixel values.

The coding and/or decoding of SAO parameters to be exchanged between a server and a client and/or stored locally or remotely for decoding pixels for the sample adaptive offset filtering will be explained in more detail hereafter with reference to any one of FIGS. 12 to 23.

Figure 11:
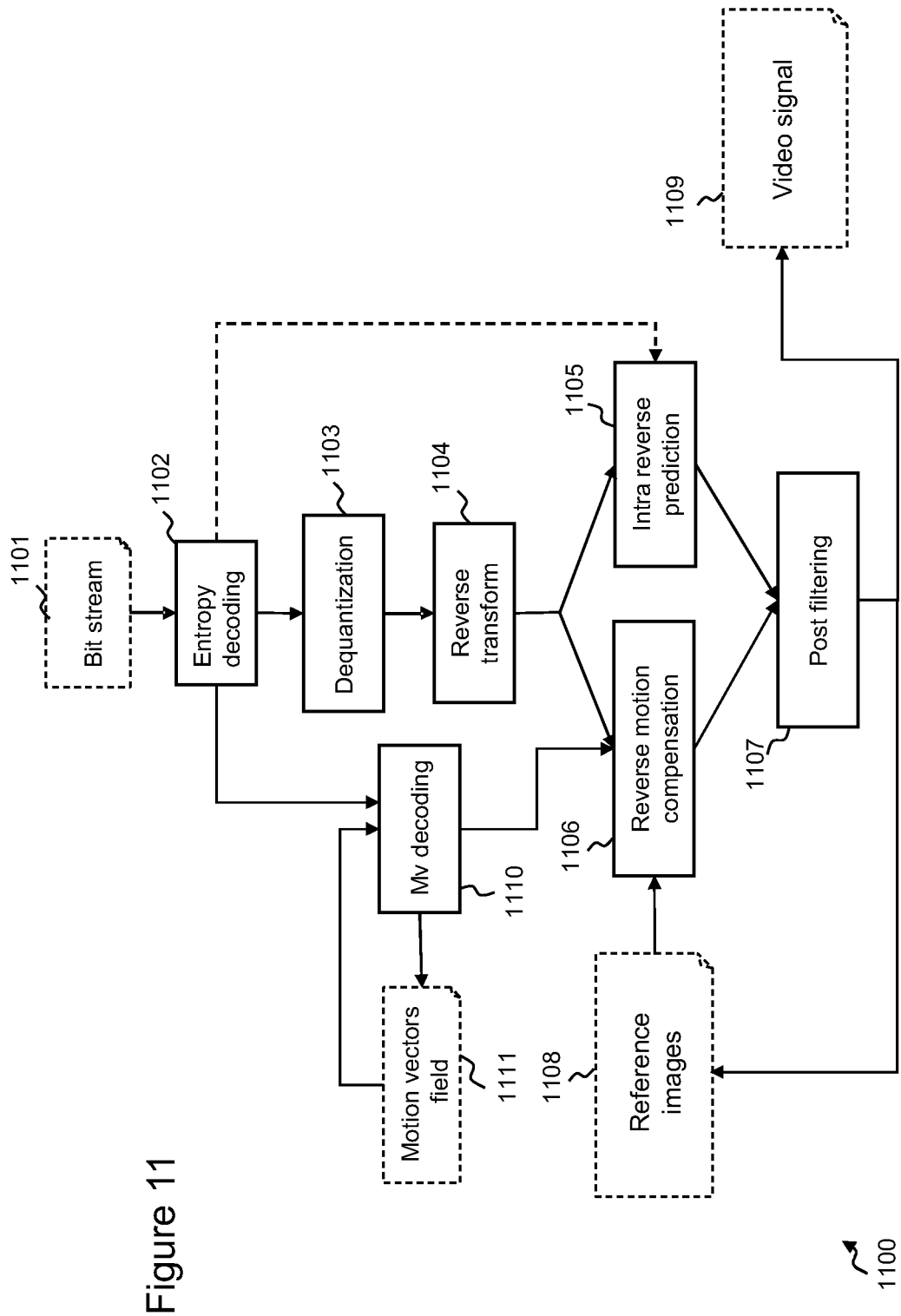
FIG. 11 is a flow chart illustrating steps of a decoding method according to embodiments of the invention.

FIG. 11 illustrates a block diagram of a decoder 1100 which may be used to receive data from an encoder according an embodiment of the invention. The decoder is represented by connected modules, each module being adapted to implement, for example in the form of programming instructions to be executed by the CPU 811 of device 800, a corresponding step of a method implemented by the decoder 1100.

The decoder 1100 receives a bitstream 1101 comprising encoding units, each one being composed of a header containing information on encoding parameters and a body containing the encoded video data. As explained with respect to FIG. 9, the encoded video data is entropy encoded, and the motion vector predictors' indexes are encoded, for a given block, on a predetermined number of bits. The received encoded video data is entropy decoded by module 1102. The residual data are then dequantized by module 1103 and then a reverse transform is applied by module 1104 to obtain pixel values.

The mode data indicating the coding mode are also entropy decoded, and based on the mode, an INTRA type decoding or an INTER type decoding is performed on the encoded blocks of image data.

In the case of INTRA mode, an INTRA predictor is determined by intra reverse prediction module 1105 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 1110.

Motion vector decoding module 1110 applies motion vector decoding for each current block encoded by motion prediction. Once an index of the motion vector predictor, for the current block has been obtained the actual value of the motion vector associated with the current block can be decoded and used to apply reverse motion compensation by module 1106. The reference image portion indicated by the decoded motion vector is extracted from a reference image 1108 to apply the reverse motion compensation 1106. The motion vector field data 1111 is updated with the decoded motion vector in order to be used for the inverse prediction of subsequent decoded motion vectors.

Finally, a decoded block is obtained. Post filtering is applied by post filtering module 1107 similarly to post filtering module 915 applied at the encoder as described with reference to FIG. 9. A decoded video signal 1109 is finally provided by the decoder 1000.

Figure 12:
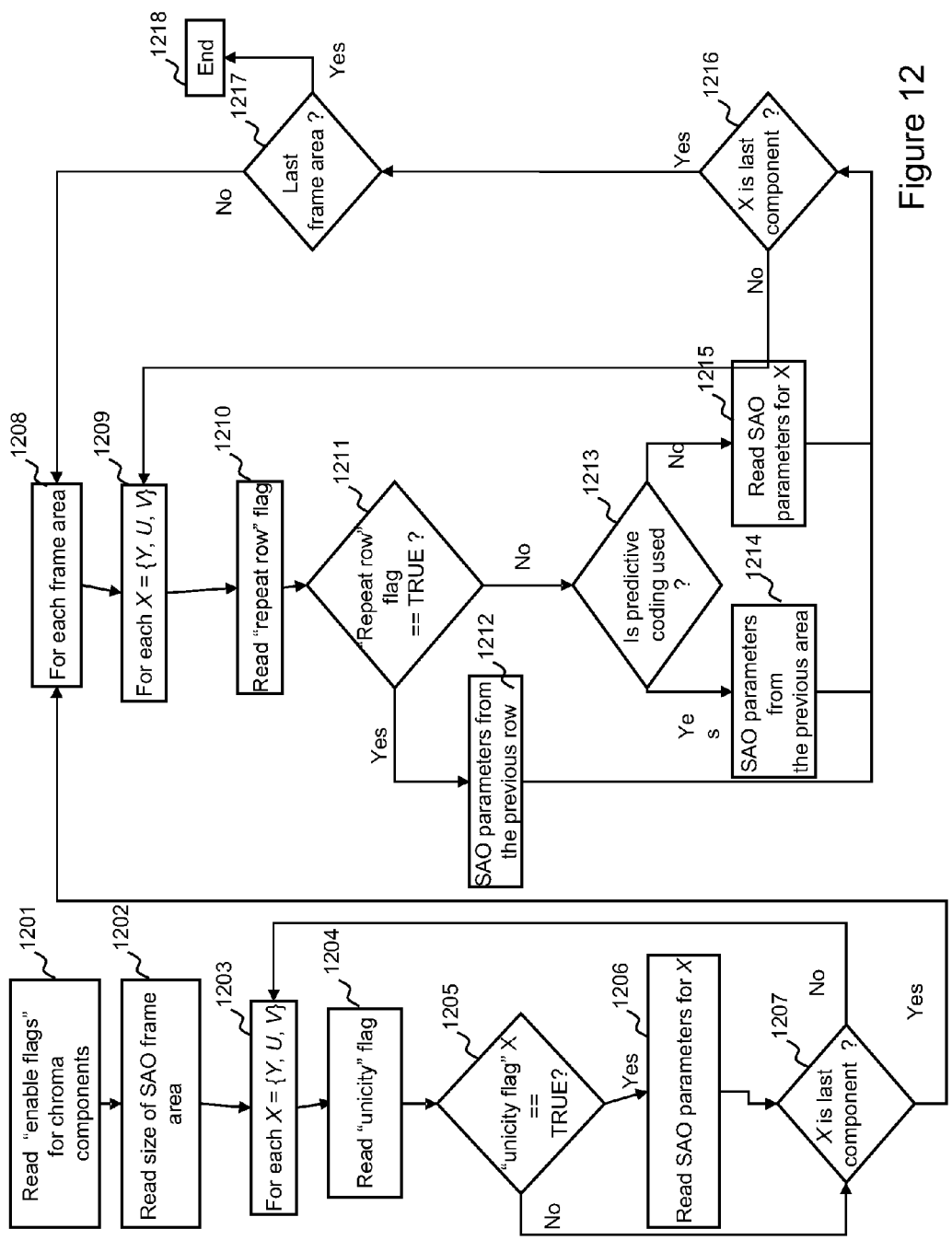
FIG. 12 is a flow chart illustrating steps of a method for obtaining SAO parameters from a bitstream according to an Adaptive Parameter Set mode.

FIG. 12 is a flow chart illustrating steps of a method for obtaining SAO parameters from a bitstream according to an Adaptive Parameter Set (APS) mode. Accordingly, FIG. 12 illustrates how SAO parameters are stored in a bitstream when the Adaptive Parameter Set mode is used to associate a single set of SAO parameters per frame area. According to this mode, a set of SAO parameters is valid for a rectangular frame area whose size is a multiple of the size of the Largest Coding Unit (LCU). In order to reduce the amount of bits to store all the SAO parameters of a frame for this particular mode, a run-length coding technique is used as well as a prediction flag from the above frame area.

According to the APS mode implemented in the current specifications of HEVC, there are flags indicating whether or not SAO loop filtering is enabled for the components of a given picture. This means that, for example, when considering a picture encoded according to the YUV scheme, SAO parameters for the U or the V component can be either enabled or disabled.

Such flags are read in an initial step 1201. Next, in step 1202 the size of the frame area to which a set of SAO parameters are to be applied is obtained. As described above, the frame area where the SAO loop filtering has to be applied when using the APS mode, corresponds to an area which is equal to the LCU size or which corresponds to a multiple size of the LCU size.

Next, a loop is launched at step 1203 to handle successively each color component of the sequence denoted X.

This loop enables reading the "unicity" flag for each component which is performed at step 1204. Next, a test is performed at step 1205 to determine whether or not the read "unicity" flag is true. If the read "unicity" flag is true, it only exists one single SAO parameter set, regarding the current processed component X, for the whole image. In such a case, the SAO parameters are read in the bitstream at step 1206. Such a step is described in detail by reference to FIG. 14. Otherwise, if the read "unicity" flag is not true, there are more than one SAO parameter for the whole image regarding the current processed component X. In such a case, the SAO parameters are read in following steps as described by reference to steps 1208 to 1218.

Next, a test is performed at step 1207 to determine whether or not the current processed component X is the last component to process. If the current processed component X is the last component to process, the algorithm is branched to step 1203 and the previous steps are repeated for the remaining component(s).

It is to be noted that if the "unicity" flag is true for one component, the steps 1208 to 1218 are not performed for that component.

From step 1208, SAO parameters are determined for each frame area and for each component when there exist more than one set of SAO parameters per component.

A loop is launched at step 1208 to handle successively each frame area of the given picture to be processed according to the frame area size determined at step 1202. In the given example of FIG. 12, the frame areas are processed in raster scan order whereby the process starts with the first row of frame areas of the image and continues until the last row of the image. Frame areas are processed from the left side to the right side of the image.

Next, another loop is launched at step 1209 to handle successively each component denoted X. It is to be noted here that if the "enable" flag of the current component, read at step 1201, is false, the next steps for the component concerned are ignored at step 1209 and the next component is selected to be processed. In step 1210 a "repeat row flag" is read. Next, in step 1211 a test is performed to determine whether or not that flag is true. If it is true, the SAO parameters of the previous row of frame area are used for the current row of frame area. This makes it possible to save many bits in representing the SAO parameters in the bitstream by just signaling that the current row uses the same parameters as the previous row.

Otherwise, if the read "repeat row flag" is false, the current frame area is coded in the bitstream and the algorithm is branched to step 1213 where a test is performed to determine whether or not a predictive technique (using run-length coding or the value of the SAO parameters of the above frame area) is used to encode and represent the SAO parameters associated with a previous frame area in the current row. In that case, the SAO parameters of the current frame area are deduced, in the current row, at step 1214, from a previous frame area. More specifically, two syntax elements are used: sao_run_diff and sao_merge_up_flag that respectively indicate if the SAO parameters are coded according to a run-length method or are deduced from the SAO parameters of the above frame area. Otherwise, if the answer is negative in step (1213), the SAO parameters for this particular frame area are explicitly coded in the bitstream. Accordingly, these SAO parameters are read from the bitstream at step 1215. This step is similar to 1206 and is further described by reference to FIG. 14.

Following step 1212, when SAO parameters are determined for an entire row, a test is performed at step 1216 to determine whether or not the current component is the last component to be processed. If it is not the last component to be processed, the algorithm is branched to step 1209 to process the next component(s). Similarly, when the SAO parameters are determined for the current frame area, either by carrying out step 1214 or step 1215, the algorithm is branched to step 1216 to determine whether or not the current component is the last component to be processed. Again, if it is not the last component to be processed, the algorithm is branched to step 1209 to process the next component(s).

Otherwise, if all the components have been processed, a test is performed at step 1217 to determine whether or not the last frame area has been processed. If the last frame area has not been processed, the process is branched to step 1208 and the previous steps are repeated. Otherwise, the process ends.

Figure 14:
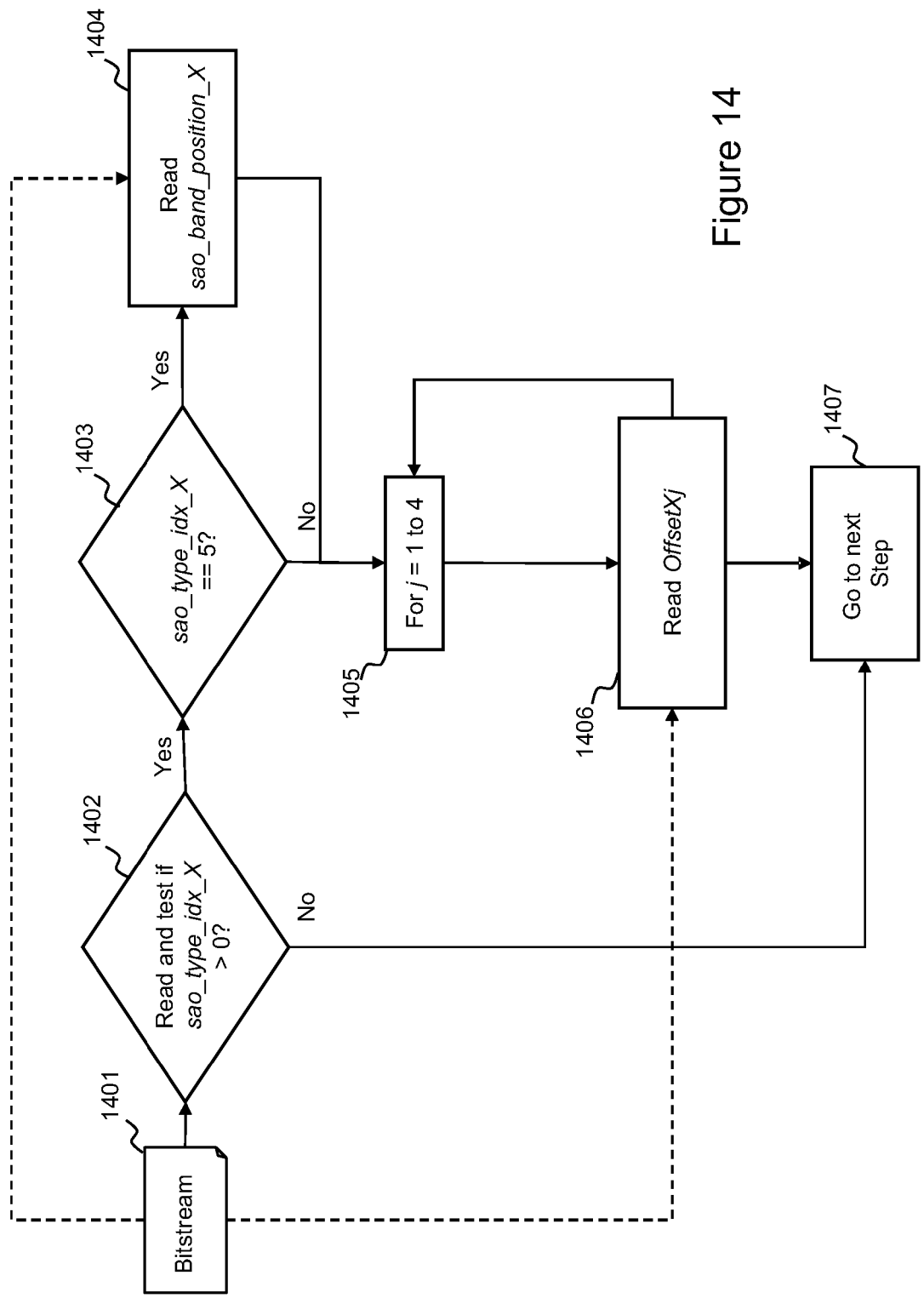
FIG. 14 is a flow chart illustrating steps of a method for reading SAO parameters in a bitstream.

At this stage, a set of SAO parameters, with the different parameters presented by reference to FIG. 14, is associated with each frame area and for each component.

Figure 13:
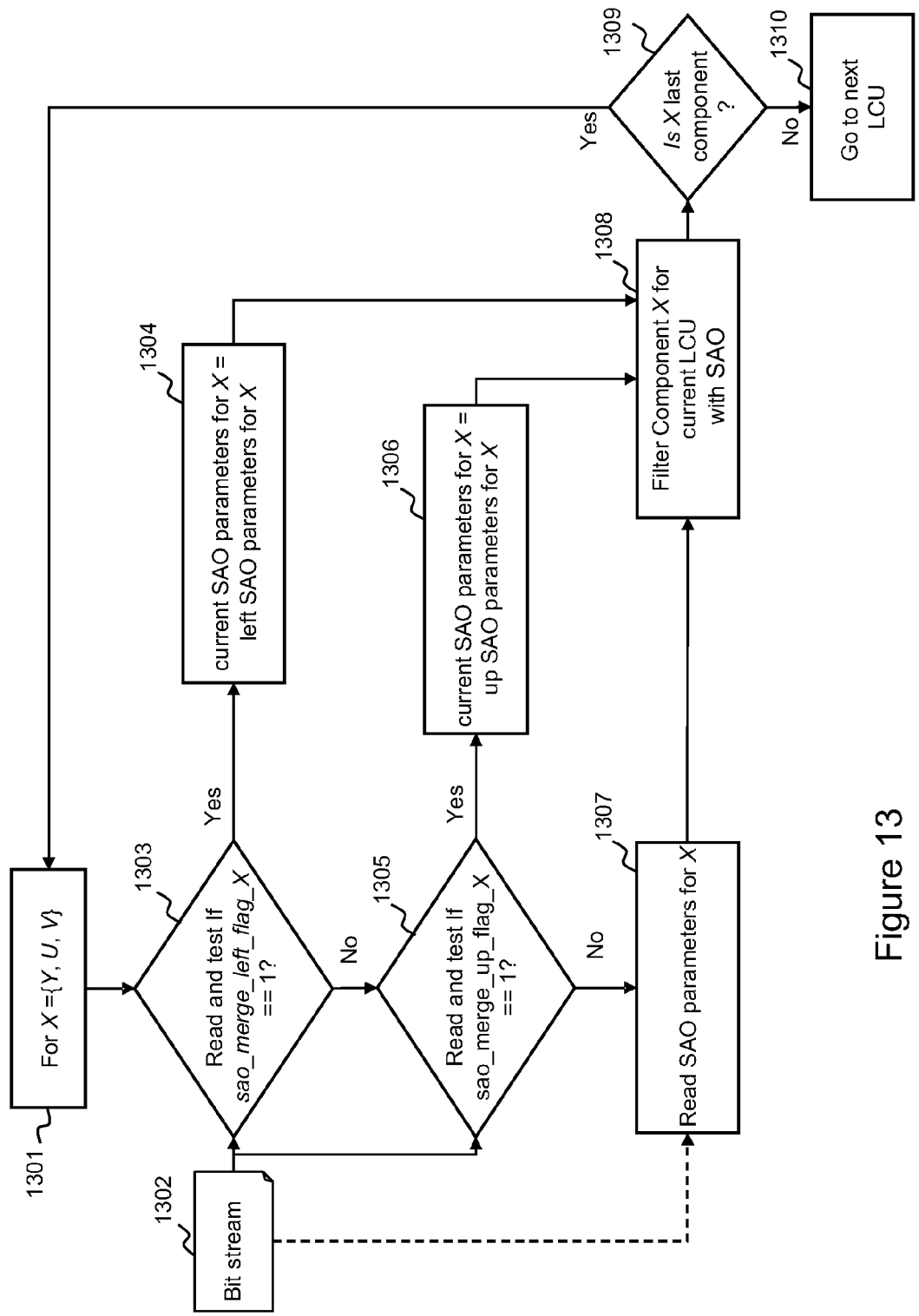
FIG. 13 is a flow chart illustrating steps of a method for obtaining SAO parameters from a bitstream according to an LCU mode.

FIG. 13 is a flow chart illustrating steps of a method for obtaining SAO parameters from a bitstream according to an LCU mode. Therefore, FIG. 13 illustrates an alternative to encode the SAO parameters to the APS mode. More specifically, FIG. 13 illustrates how SAO parameters can be stored in a bitstream when the Largest Coding Unit (LCU) mode representation is used to associate a single set of SAO parameters per LCU. In order to avoid encoding one set of SAO parameters per LCU, which is costly, a predictive scheme can be used. In the given example, this predictive mode consists in checking if the LCU positioned on the left of the current LCU uses the same SAO parameters. If not, a second check is performed with the LCU positioned above the current LCU. This predictive technique enables a reduction in the amount of data to represent SAO parameters for the LCU mode. It is based on the use of dedicated flags referred to as Merge flags.

In step 1301 a loop is launched to handle successively each component denoted X. For the sake of illustration, images are still encoded according to the YUV scheme. Next, in step 1303 a flag denoted sao_merge_left_flag_X (wherein X stands for Y, U, or V) is read from the bitstream 1302 to be processed and decoded. If its value is true, the SAO parameters of the LCU positioned on the left of the current LCU are selected at step 1304 to be used for processing the current LCU. More specifically, this enables determination at step 1308 of the type of SAO loop filter to be applied on the current LCU.

Otherwise, if the read flag denoted sao_merge_left_flag_X is false, a flag denoted sao_merge_up_flag_X (wherein X stands for Y, U, or V) is read from the bitstream 1302 and decoded. If its value is true, the SAO parameters of the LCU positioned above the current LCU are selected at step 1306 to be used for processing the current LCU. Again, this enables determination at step 1308 of the type of SAO loop filter to be applied on the current LCU.

Otherwise, if the read flag denoted sao_merge_up_flag_X is false, SAO parameters to be used for processing the current LCU are read and decoded from bitstream 1302 at step 1307, the latter being described by reference to FIG. 14.

At this stage, SAO parameters for processing the current LCU are obtained and the type of SAO loop filter to be applied on the current LCU is determined at step 1308.

Next, in step 1309 a test is performed to determine whether or not all components Y, U, and V have been processed for the current LCU. If not all the components have been processed, the next component is selected, the algorithm is branched to step 1301, and the previous steps are repeated.

Next, the next LCU can be processed similarly.

FIG. 14 is a flow chart illustrating steps of a method for reading SAO parameters in a bitstream. Accordingly, FIG. 14 illustrates the way SAO parameters are stored in an encoded bitstream.

In an initial step 1402, a flag denoted sao_type_idx_X (wherein X stands for Y, U, or V) is read from the bitstream 1401 and decoded. The codeword that represents this syntax element can use a fixed length code or any method of arithmetic coding.

As described above by reference to Table 1 of the Appendix, this syntax element makes it possible to determine the type of the SAO loop filter to be applied on the frame area to process component X. According to the given example, the flag sao_type_idx_X (or generically sao_type_idx) can take one of five values that depends on the SAO loop filter to be applied. As stated in Table 1 of the Appendix, 0 correspond to no SAO loop filter, 1 to 4 correspond to the 4 categories of Edge offset SAO loop filter as described by reference to Table 2 of the Appendix, and value 5 corresponds to the Band offset SAO loop filter.

A test is performed at step 1402, after having read and decoded the flag sao_type_idx_X, to determine whether or not the value of this index is strictly positive. If the value of this index is equal to zero, which means that no SAO loop filter is to be applied on the current frame area, the determination of the SAO parameters ends at step 1407. Otherwise, if the value of the flag sao_type_idx_X is strictly positive, SAO parameters exist in bitstream 1401 for the current frame area.

Next, a test is performed at step 1403 to determine whether or not the type of the SAO loop filter to be applied is of the Band offset type (sao_type_idx_X==5). If the SAO loop filter to be applied is of the Band offset type, the position of the SAO band is read at step 1404 in bitstream 1401 and decoded.

After having read the position of the SAO band at step 1404, a loop is launched at step 1405 for reading and decoding four Offset$_j$ (j varying from 1 to 4) at step 1406 from bitstream 1401. These four offsets correspond to the four offsets relating to the four ranges of the SAO Band offset as described by reference to FIG. 2.

Similarly, if the value of the flag sao_type_idx_X is positive and different from 5, a loop is launched at step 1405 for reading and decoding four Offset$_j$ (j varying from 1 to 4) from bitstream 1401. These four offsets correspond to the four offsets of the four types of SAO Edge offset as described by reference to Table 2 of the Appendix.

When the four offsets have been read and decoded at step 1406, the reading of the SAO parameters ends at step 1407.

According to a first main embodiment, some or all SAO parameters are shared between components. To that end, processes are defined to derive SAO parameters from one component to another. Such dependencies between components can be defined for the two kinds of SAO classifications (Edge and Band offsets).

As described previously by reference to FIG. 13, two flags denoted sao_merge_left_flag_X and sao_merge_up_flag_X are used in the current implementation of HEVC for the LCU mode so as to obtain SAO parameters as a function of previously processed SAO parameters. The flag denoted sao_merge_left_flag_X aims at specifying that the SAO parameters to be used for processing component X of the current LCU are those used for processing the same component of the LCU positioned on the left of the current LCU. Similarly, the flag denoted sao_merge_up_flag_X aims at specifying that the SAO parameters to be used for processing component X of the current LCU are those used for processing the same component of the LCU positioned above the current LCU.

According to a particular embodiment, these flags are common for two or three components of the current LCU. In other words, the flags of the sao_merge_left_flag and sao_merge_up_flag types are no longer used to specify that the SAO parameters to be used for processing a component of the current LCU are those used for processing the same component of another LCU but to specify that the SAO parameters to be used for processing two or three components of the current LCU are those used for processing the same two to three components of another LCU. For the sake of illustration, flags denoted sao_merge_left_flag_UV and sao_merge_up_flag_UV can be considered to specify that the SAO parameters to be used for processing U and V components of the current LCU are those used for processing U and V components of the LCU positioned on the left or above the current LCU, respectively.

According to another particular embodiment, flags are used to specify that the SAO parameters to be used for processing two or three components of the current LCU are those used for processing a component of another LCU. As a consequence, a flag associated with a component of the current LCU can indicate which of the left or up LCU is to be used as reference and, in that LCU, which of the components is to be used for obtaining SAO parameters. Therefore, the flags may be the followings: sao_merge_left_flag_Y, sao_merge_left_flag_U, sao_merge_left_flag_V, sao_merge_up_flag_Y, sao_merge_up_flag_U, and sao_merge_up_flag_V. For the sake of illustration, the SAO parameters of a component of the current LCU that refers to the flag sao_merge_left_flag_V are the SAO parameters associated with component V of the LCU positioned on the left of the current LCU.

In this embodiment, the SAO parameters associated with each component of an LCU are preferably the same (for each component of this LCU) when they refer to those of another LCU. For the sake of illustration, the SAO parameters of all the components of the current LCU which a component refers to the flag sao_merge_left_flag_V are the SAO parameters associated with component V of the LCU positioned on the left of the current LCU. Accordingly, the SAO parameters of the left Luma (Y) component can be used for filtering the Chroma (U) component of the current LCU.

Figure 15:
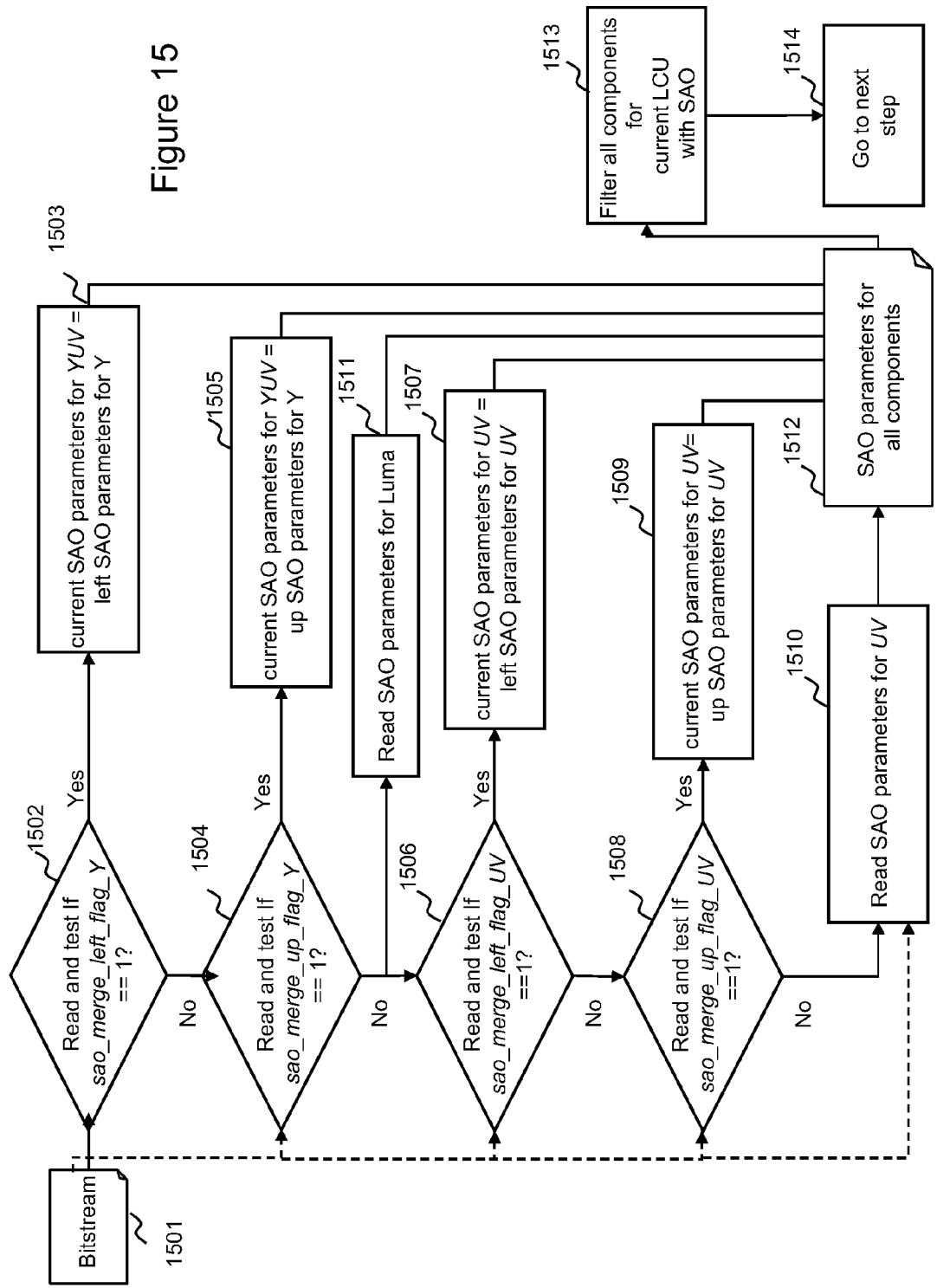
FIGS. 15 and 16 are flow charts illustrating steps of a method according to a first embodiment of the invention for determining parameters to be used in a loop filter for processing a current frame area.

FIG. 15 is a flow chart illustrating steps of a method according to a first embodiment of the invention for determining parameters to be used in a loop filter for processing a current frame area. The example given in FIG. 15 can be seen as a combination of the two particular embodiments described here above.

In step 1502 the flag denoted sao_merge_left_flag_Y is obtained from bitstream 1501 and a test is performed to determine whether or not the value of this flag is equal to one (i.e. if it is true). If the flag denoted sao_merge_left_flag_Y is true, it is determined at step 1503 that the SAO parameters to be used for filtering components Y, U, and V of the current LCU are equal to the ones previously determined for filtering component Y in the LCU positioned on the left of the current LCU.

Accordingly, the value of the flags sao_type_idx_U and sao_type_idx_V for the current LCU, defining the type of the loop filter to be applied on component U and V of the current LCU, are considered equal to that of the flag sao_type_idx_Y of the LCU positioned on the left of the current LCU. Likewise, the other SAO parameters used for filtering components U and V of the current LCU, for example offset values and, if needed, band positions (sao_band_position_U and sao_band_position_V) are obtained from those of component Y of the LCU positioned on the left of the current LCU.

Otherwise, if the flag denoted sao_merge_left_flag_Y is false, the flag denoted sao_merge_up_flag_Y is obtained from bitstream 1501 and a test is performed to determine whether or not the value of this flag is equal to one (i.e. if it is true) at step 1504. If the flag denoted sao_merge_up flag_Y is true, it is determined at step 1505 that the SAO parameters to be used for filtering components Y, U, and V of the current LCU are equal to those previously determined for filtering component Y in the LCU positioned above the current LCU.

Accordingly, the value of the flags sao_type_idx_U and sao_type_idx_V for the current LCU, defining the type of the loop filter to be applied on components U and V of the current LCU, are considered equal to that of the flag sao_type_idx_Y of the LCU positioned above the current LCU. Likewise, the other SAO parameters used for filtering components U and V of the current LCU, for example offset values and, if needed, band positions (sao_band_position_U and sao_band_position_V) are obtained from those of component Y of the LCU positioned above the current LCU.

Otherwise, if the flag denoted sao_merge_up_flag_Y is false, SAO parameters for component Y of the current LCU are extracted from bitstream 1501 at step 1511 as described above by reference to FIG. 14. In such a case, the value of the flags sao_type_idx_Y, sao_band_position_Y (if needed), and the four offsetj_Y are extracted from the bitstream 1501.

Next, if the flag denoted sao_merge_up_flag_Y is false, in step 1506 the flag denoted sao_merge_left_flag_UV is obtained from bitstream 1501 and a test is performed to determine whether or not the value of this flag is equal to one (i.e. if it is true). If the flag denoted sao_merge_left_flag_UV is true, it is determined at step 1507 that the SAO parameters to be used for filtering components U and V of the current LCU are equal to those previously determined for filtering components U and V, respectively, in the LCU positioned on the left of the current LCU.

Otherwise, if the flag denoted sao_merge_left_flag_UV is false, the flag denoted sao_merge_up_flag_UV is obtained from bitstream 1501 and a test is performed to determine whether or not the value of this flag is equal to one (i.e. if it is true) at step 1508. If the flag denoted sao_merge_up_flag_UV is true, it is determined at step 1509 that the SAO parameters to be used for filtering components U and V of the current LCU are equal to those previously determined for filtering components U and V, respectively, in the LCU positioned above the current LCU.

Otherwise, if the flag denoted sao_merge_up_flag_UV is false, SAO parameters for components U and V of the current LCU are extracted from bitstream 1501 at step 1510 as described above by reference to FIG. 14. In such a case, the value of the flags sao_type_idx_U, sao_type_idx_V, sao_band_position_U (if needed), sao_band_position_V (if needed), the four offsetj_U, and the four offsetj_V are extracted from bitstream 1501. At this stage (reference 1512), all SAO parameters for all components of the current LCU are available.

Next, in step 1513 the SAO loop filter is applied on all components of the current LCU and the decoding process goes to the next decoding step 1314.

Still according to a particular embodiment, flags common to all components of the current LCU, for example sao_merge_left_flag_YUV and sao_merge_up_flag_YUV flags, can be used. In such a case, if both flags are false, flags directed to each component, generically referred to as sao_merge_left_flag_X and sao_merge_up_flag_X (wherein X stands for Y, U, or V), can be used.

Figure 16:
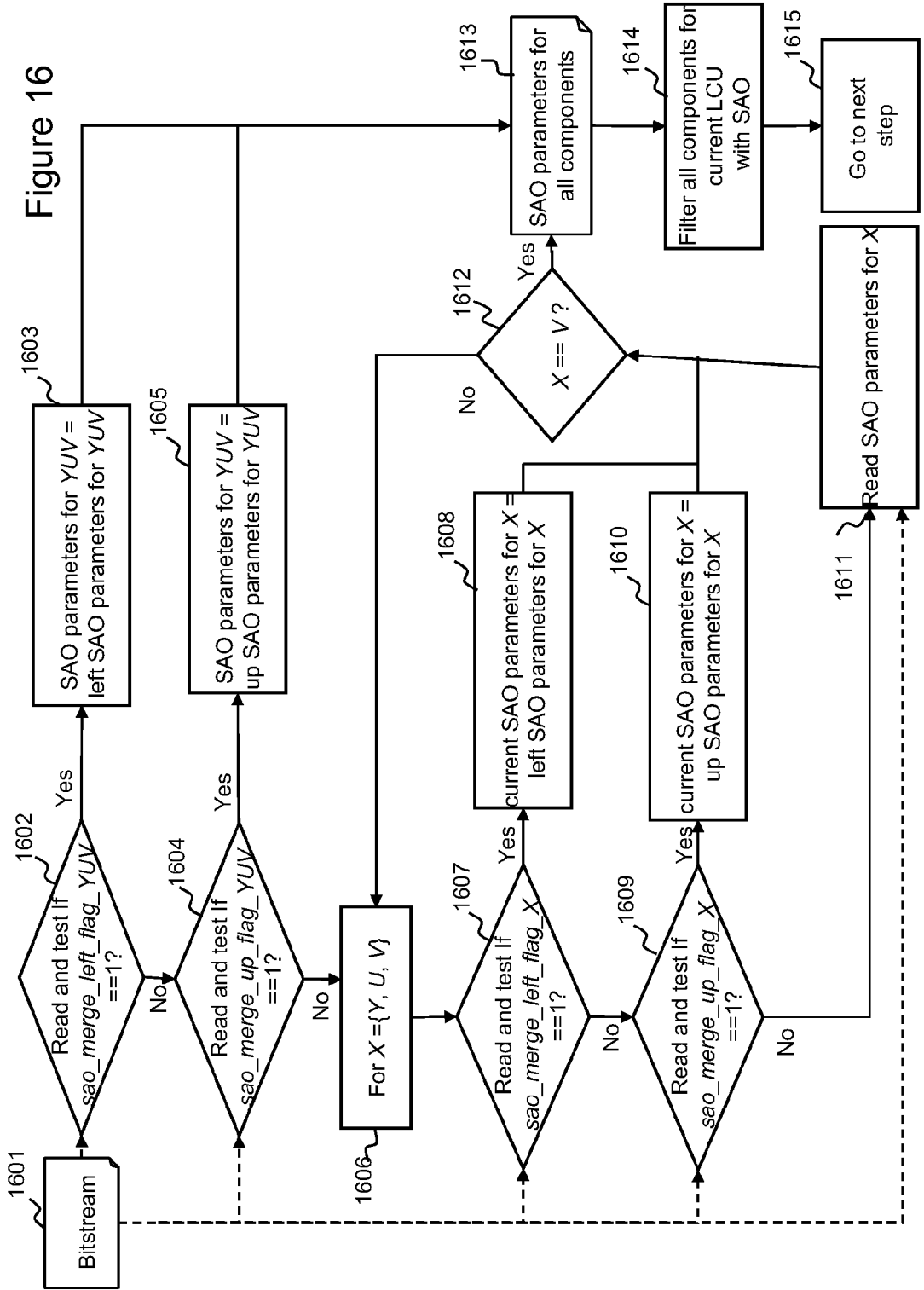

FIG. 16 is a flow chart illustrating steps of a method according to the first embodiment of the invention for determining parameters to be used in a loop filter for processing a current frame area. The example given in FIG. 16 is more specifically directed to the third particular embodiment described here above.

In step 1602 the flag denoted sao_merge_left_flag_YUV is obtained from bitstream 1601 and a test is performed to determine whether or not the value of this flag is equal to one (i.e. if it is true). If the flag denoted sao_merge_left_flag_YUV is true, it is determined at step 1603 that the SAO parameters to be used for filtering components Y, U, and V of the current LCU are equal to those previously determined for filtering component Y, U, and V, respectively, in the LCU positioned on the left of the current LCU.

Accordingly, the value of the flags sao_type_idx_Y, sao_type_idx_U, and sao_type_idx_V for the current LCU, defining the type of the loop filter to be applied on components Y, U, and V of the current LCU, are considered equal to that of the corresponding flags of the LCU positioned on the left of the current LCU. Likewise, the other SAO parameters used for filtering components Y, U and V of the current LCU are obtained from those of the corresponding component of the LCU positioned on the left of the current LCU.

Otherwise, if the flag denoted sao_merge_left_flag_YUV is false, the flag denoted sao_merge_up_flag_YUV is obtained from bitstream 1601 and a test is performed to determine whether or not the value of this flag is equal to one (i.e. if it is true) at step 1604. If the flag denoted sao_merge_up_flag_YUV is true, it is determined at step 1605 that the SAO parameters to be used for filtering components Y, U and V of the current LCU are equal to those previously determined for filtering components Y, U and V, respectively, in the LCU positioned above the current LCU.

Otherwise, if the flag denoted sao_merge_up flag_YUV is false, the flags associated with each component of the current LCU, for determining whether or not SAO parameters are to be obtained as a function of previous processed SAO parameters, are decoded.

To that end, a loop is launched at step 1606 for processing sequentially each component of the current LCU. For each component X (with X being equal to Y, U, or V), the flag denoted sao_merge_left_flag_X is extracted from bitstream 1601 and a test is performed to determine whether or not the value of this flag is equal to one (i.e. if it is true) at step 1607. If the flag denoted sao_merge_left_flag_X is true, it is determined at step 1608 that the SAO parameters to be used for filtering component X of the current LCU are equal to those previously determined for filtering the same component in the LCU positioned on the left of the current LCU.

Otherwise, if the flag denoted sao_merge_left_flag_X is false, the flag denoted sao_merge_up_flag_X is obtained from bitstream 1601 and a test is performed to determine whether or not the value of this flag is equal to one (i.e. if it is true) at step 1609. If the flag denoted sao_merge_up_flag_X is true, it is determined at step 1610 that the SAO parameters to be used for filtering component X of the current LCU are equal to those previously determined for filtering the same component in the LCU positioned above the current LCU.

Otherwise, if the flag denoted sao_merge_up_flag_X is false, SAO parameters for component X for the current LCU are extracted from the bitstream 1601 at step 1611.

Next, after having obtained SAO parameters for component X of the current LCU, in step 1612 a test is performed to determine whether or not component X is component V. If component X is not component V, the process is branched to step 1606 to process the next component. Otherwise, if component X is component V, SAO parameters are decoded and available for all the components of the current LCU at step 1613.

Next, in step 1614 the components of the current LCU are filtered in an SAO loop filter using the obtained SAO parameters and the decoder goes to the next decoding step at step 1615.

It is to be noted that the embodiments described by reference to FIGS. 15 and 16 are based on the LCU syntax described by reference to FIG. 13. However, these embodiments can also be based on the SAO syntax for APS as described by reference to FIG. 12. In that particular case, the parameters shared between components are the SAO parameters as well as the flags denoted unicity and repeat row and the syntax elements denoted sao_run_diff and sao_merge_up_flag.

As described above, in particular by reference to Table 1 of the Appendix, the syntax element or flag denoted sao_type_idx specifies that the current component of the current LCU is not processed when its value is equal to zero. Otherwise, it specifies the SAO type. If the value of the flag sao_type_idx is equal to 1, 2, 3, or 4, the Edge offset classification is used to filter the current LCU and if the value of the flag sao_type_idx is equal to 5, the SAO Band offset is used to filter the current LCU.

According to embodiments of the invention as described above, such flags denoted sao_type_idx can be shared between two or three components.

In another particular embodiment, components can share only some values of the flag denoted sao_type_idx. In other words, a second component shares the value of the flag denoted sao_type_idx of a first component only if this value belongs to a predetermined set of values. Therefore, according to this embodiment, the value of the flag denoted sao_type_idx is conditionally shared.

For the sake of illustration, it can be assumed that the value of the flag denoted sao_type_idx associated with component Y is shared, for a given LCU, with component U. However, it can be made possible that if this value indicates a SAO classification of Edge offset type (i.e. sao_type_idx=1, 2, 3, or 4), the direction of the Edge offset is nevertheless obtained from a bitstream part associated with component U instead of using the direction of the Edge offset classification as given by the component Y. If the value of the flag denoted sao_type_idx, associated with component Y is not equal to an Edge Offset (sao_type_idx=0 or 5), no direction information is extracted from the bitstream. In other words, if the SAO type for component Y is zero or five, this SAO parameter (regarding the type) will be used by components U and V. However, if the SAO type is of the Edge offset type (i.e. value from one to four) for component Y, dedicated SAO types will be used for components U and V.

As described above, SAO parameters (associated with SAO loop filter using pixel classification of the Edge offset type) comprise four offsets that are related to the four classes, out of the five possible classes. The first class (class "0") corresponds to no SAO filtering. It is to be recalled here that the direction of the Edge offset classification is signaled in the SAO type.

According to embodiments of the invention, these four offsets can be shared between two or three components when an Edge offset filter is selected for the current LCU, independently of the direction of Edge offset classification.

According to a first particular embodiment, the same offsets are used for two or three components. Consequently, only four offsets need to be extracted from a bitstream instead of eight or twelve if respectively two or three components share the same four offsets, for filtering pixels with three components.

Naturally, such common offsets have to be computed at the encoder side for allowing processing of two or three components with the same offsets. As described below, this encoding choice is the same as the one used for Band offset filtering.

In another particular embodiment, offsets Ozj associated with component Z are derived from offsets Oxj of another component X according to a weighting factor $\beta j$ as follows:

$$Ozj = \beta j Oxj$$

The weighting factor $\beta j$ can be the same whatever the value of j is ($\beta = \beta j$) or not. The value of $\beta$ or the values of $\beta j$ can be predetermined and constant or can be transmitted in particular headers like the sequence header or a slice header, or even transmitted LCU by LCU (or more generally frame area by frame area).

When the values vary from one LCU to another, they can be dynamically computed at the encoder and decoder sides.

The values of the weighting factors can be computed according to the following formula:

$$\beta_j = \frac{\sum_{i=0}^{N} \max(|c_i^Z - c_{in1}^Z|, |c_i^Z - c_{in2}^Z|)}{\sum_{i=0}^{N} \max(|c_i^X - c_{in1}^X|, |c_i^X - c_{in2}^X|)}$$

where $c_i^Z$ is the value of component Z of pixel i of class j and where $c_{in1}^Z$ and $c_{in2}^Z$ are the values of component Z of the neighbors of pixel i of class j as described above, in particular by reference to Table 2 of the Appendix.

Accordingly, the value of the weighting factor $\beta j$ is the ratio between the average (maximum) difference of component Z of the classified pixels and their neighboring pixels and the average (maximum) difference of component X of the classified pixels and their neighboring pixels. Other relationships or formulas can be used to compute the values of the weighting factor $\beta j$ (or of $\beta$).

Still in another particular embodiment, the value of the offsets encoded in a bitstream can depend on the values of the weighting factor $\beta j$ (or $\beta$), however they are determined. In such an embodiment, if the value of the weighting factor $\beta$ or $\beta j$ is less than one, the value of the offset Ozj is encoded in the bitstream instead of the value of the offset Oxj.

Indeed, in the formula Ozj=$\beta j$ Oxj, Ozj<Oxj if $\beta j$<1. As a consequence, the offset value Ozj needs less bits to be encoded in the bitstream than the value of Oxj. Since, the decoder knows or can determine the values of the weighting factor $\beta j$, it can decode the value of Ozj from the bitstream and determine the value of Oxj according to the following formula:

$$Ozj = (1/\beta j) \times Oxj$$

Still in a particular embodiment, the absolute value of the offsets Ozj associated with a second component Z are equal to the absolute value of offsets Ox(5−j) associated with a first component X. It is to be noted here that according to this particular embodiment, only the absolute value is used since the sign of the offset for Edge offset class is predetermined to reduce artifacts.

FIG. 17 illustrates such a particular embodiment according to which the values of the offsets associated with a component correspond to the mirrored values of the offsets associated with a second component. As illustrated, the offset for the 4 classes of component Z are derived from offsets from component X by considering the inverse order of the offsets. It is to be recalled here that signs applied to offsets are deduced from the classification.

Still in another particular embodiment, the mirrored values of offsets associated with a first component used as offsets associated with a second component can be weighted with weighting factors βj. According to this particular embodiment, the absolute value of the offsets Ozj associated with a second component Z are equal to the weighted absolute value of the offsets Ox(5−j) associated with a first component X according to the following formula:

$$Ozj=\beta j Ox(5-j)$$

As described above, the SAO Band offset filter needs two types of parameters. The first type is directed to a position (sao_band_position) and the second type is directed to the four offsets relating to the four classes of the band that is defined from the given position. According to embodiments of the invention, the two types of parameters associated with components of a frame area may be obtained separately from the corresponding parameters associated with components of another frame area already processed. However, the embodiments that relate to the position (sao_band_position) and those that relate to the offsets can be easily combined. Moreover, as described previously by reference to the Edge offset embodiments, these embodiments or combinations of embodiments that relate to positions and offsets for Band offset filtering are applied as a function of the values of Merge flags or of the SAO syntax for APS, as described above.

It is to be noted that as SAO parameters associated with a component can be used to process two or three components, the following description focuses on the use of SAO parameters associated with one component for processing two components for the sake of illustration.

Figure 18:
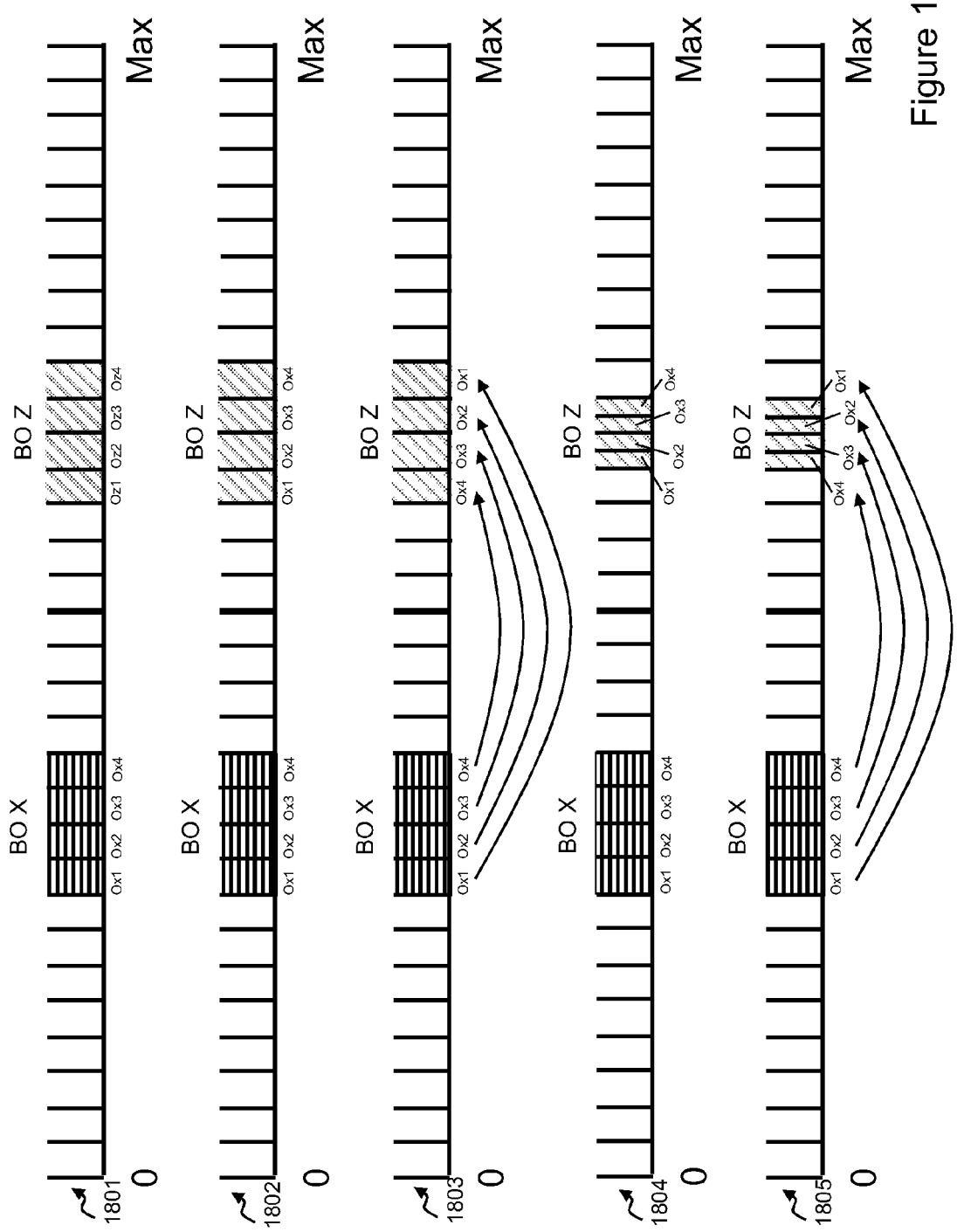
FIG. 18 illustrates how values of offsets associated with a second component can be obtained from values of offsets associated with a first component when applying an SAO loop filter using a Band offset classification.

FIG. 18 illustrates how values of offsets associated with a second component Z can be obtained from values of offsets associated with a first component X when applying an SAO loop filter using a Band offset classification.

Reference 1801 illustrates the use of SAO parameters, in particular of offsets associated with components for applying an SAO loop filter using a Band offset classification, according to the current HEVC specifications. The offsets associated with each component are all encoded in the bitstream used for transmitting the encoded images. For the sake of illustration, the bitstream comprises offsets Ox1 to Ox4, generically referred to as Oxj, associated with a first component X and offsets Oz1 to Oz4, generically referred to as Ozj, associated with a first component Z. As illustrated by reference 1801, offsets Oxj correspond to a first band comprising four consecutive classes denoted BO X and offsets Ozj correspond to a second band, also comprising four consecutive classes, denoted BO Z.

Reference 1802 shows a first particular embodiment where offsets Ozj are equal to offsets Oxj. Therefore, offset Ozj are not encoded in the bitstream. They can be recovered by using corresponding Merge flags as described above by reference to Edge offset filtering. Similarly, a weighting factor β or βj can be used so that offsets Ozj can be determined as a function of offsets Oxj (Ozj=βj Oxj). Again, the value or values of weighting factor β or βj can be predetermined or represented at different levels in the bitstream (at sequence level, frame level, slice level, or LCU level). In this context, the value or values of weighting factor β or βj can be negative (for Edge offset, the sign of the offsets is determined as a function of the class). In particular, the weighting factor can be equal to minus one (β=−1).

Still in another particular embodiment, the value or values of the weighting factor β or βj can be determined dynamically. For the sake of illustration, the value or values of the weighting factor β or βj can be determined as a function of the position of the band (sao_band_position). For example, if class j of band Z and class j of band X are not in the same sub intervals in view of the center of the interval (represented in bold line in FIG. 18) β=−1 otherwise β=1. It is considered here that the full interval is split into two sub intervals, the first one being the interval of pixel values from 0 to 127 and the second one being the interval of pixel values from 128 to 256 (when 8 bit depth is used for pixel value).

According to another embodiment, the values of weighting factor βj are determined as a function of the ratio between the distance of the current class of component Z (or the set of classes for the value of weighting factor β) to the center of the interval and the distance between the current class of component X (or the set of classes for the value of weighting factor β) to the center of the interval, which can be expressed as follows:

$$\beta_j = \frac{\text{sao\_band\_position}\_Z_j - 16}{\text{sao\_band\_position}\_X_j - 16}$$

where sao_band_position_$Z_j$−16 is the distance between the current component Z and the center of the interval and sao_band_position_$X_j$−16 is the distance between the current component X and the center of the interval. In another embodiment, the inverse ratio could be considered. As for Edge offset, other relationships and formulas can be used to determine the value or values of the weighting factor β or βj. Moreover, as described above, offsets Oxj or offsets Ozj can be inserted in the bitstream depending upon the value or values of the weighting factor β or βj (however they are determined) in order to reduce the number of bits needed to encode offsets Oxj or offsets Ozj.

Reference 1803 illustrates how mirrored values of offsets associated with a first component can be used as values of offsets associated with a second component for the Band offset filtering. As described above by reference to the Edge offset filtering, the relationships between offsets Ozj and Oxj can be expressed by the following formula:

$$Ozj=Ox(5-j)$$

Again, this particular embodiment can be combined with the use of weighting factor according to the formula Ozj=βj Ox(5−j). In a particular embodiment, βj is equal to −1.

A specific derivation of the offsets for the Band offset filtering is the increase or decrease of the size of the classes enabling modification of pixel Band offset classification. Reference 1604 illustrates an example of such a classification adaptation. According to the illustrated example, the number of pixels per class is divided by two for component Z compared to the band classification for component X. Therefore, pixel classification for component Z, according to Band offset filtering, requires checking of six bits. In other words, the six most significant bits have to be checked for classifying a pixel. Therefore, it may be considered that the full pixel value interval is divided into 64 ranges for component Z.

This relationship can be fixed for the implementation or can be signaled at the sequence, frame, slice, or LCU level. It can be determined dynamically by taking into account the ratio of the pixel range size for component X and the pixel range size for component Z at LCU level (or sequence, frame, or slice). Accordingly, the size of the classes for component Z can be determined as follow:

$$size(\text{class\_Z}) = \frac{\max(P_{zi}) - \min(P_{zi})}{\max(P_{xi}) - \min(P_{xi})} size(\text{class\_X})$$

for all i=0 to N, where Pzi are the pixels of component Z and Pxi are the pixels of component X. To simplify the band classification, the number of pixel values per class is equal to a power of two (allowing bit checking of most significant bits).

This particular embodiment can be combined with all other particular embodiments described for the derivation of offsets of the Band offset as illustrated by reference 1805 where this embodiment is combined with the use of mirrored value offsets associated with component X.

In another particular embodiment that is applicable to both SAO Edge and Band filtering, the offsets from one component can be derived from two or three components.

All described embodiments applicable to both SAO Edge and Band filtering, that relate to the use of offsets from one component to determine (or derive) the offsets for one or two other components, present advantages, in particular regarding the size of the requested memory buffer when such a derivation is systematically used (for all LCUs) since the offsets of the second component and/or third component do not need to be stored.

In another particular embodiment (for both SAO Edge and Band filtering), the offsets derivation between components can be used to predict the offsets from a second component according to the offsets from a first component. (The description is dedicated to sharing offsets between components). In this embodiment, the residuals of the offsets of component Z are encoded in the bitstream instead of encoding directly the offsets value of component Z. At the decoder side the offsets of component Z are obtained by adding residual offsets to the offsets of component X.

In another particular embodiment applicable to both SAO Edge and Band offset filtering, the offsets derivation between components can be used as a context for the context arithmetic coding of the offsets associated with a second component according to the offsets associated with a first component.

Still in another particular embodiment applicable to both SAO Edge and Band filtering, the offsets derivation between two components can be signaled in the bitstream and can be in competition with the conventional mode whereby the offsets are encoded in the bitstream for all the components.

As described above, a band position (sao_band_position) is the position of the first class of a band in the full pixel value intervals. By considering a standard five bits checking, the value of the sao_band_position parameter belongs to the range [0; 32]. According to embodiments of the invention, this parameter can be shared between two or three components. For the sake of illustration, the description focuses on the derivation of this parameter regarding a component Z from its value associated with a component X.

FIG. 19 illustrates how a value of the sao_band_position parameter associated with a second component Z can be obtained from the value of the sao_band_position parameter associated with a first component X when applying an SAO loop filter using a Band offset classification.

Reference 1901 illustrates an example of two sao_band_position values that are transmitted in the bitstream according to the current HEVC specifications.

In a particular embodiment illustrated by reference 1902, a common sao_band_position value is used for both component Z and component X.

In particular embodiments, the center position of a band is compared to the center of the full pixel interval. The resulting value is equal to sao_band_position −14 (14 corresponding to the center of the interval (16) minus the center of the band (−2)).

Accordingly, in a particular embodiment illustrated by reference 1903, the sao_band_position_Z associated with component Z is defined as being symmetrical to the sao_band_position_X associated with component X with respect to the center of the full pixels interval. Therefore, (sao_band_position_Z−14) is deemed to be equal to −(sao_band_position_X−14). Since sao_band_position_X is equal to six in this example, sao_band_position_Z is thus equal to twenty two (−(6−14)+14=22).

Still in a particular embodiment illustrated by reference 1904, a weighting factor β is used to determine the sao_band_position_Z value associated with component Z as a function of the sao_band_position_X value associated with component X and of the position of the center of the full pixel interval. This is based, as in the previous embodiment, on the relative position between the center of the full pixel interval and the sao_band_position value of each component X and Z. According to this example, the relationship to be used can be the following sao_band_position_Z−14=β(sao_band_position_X−14)

that is to say sao_band_position_Z=β(sao_band_position_X−14)+14

In the example given in FIG. 19, β=−½. In that case sao_band_position_X is equal to 6 and consequently sao_band_position_Z is equal to eighteen (−½(6−14)+14=18).

The value of the weighting factor β can be predetermined for the implementation or transmitted at any level (sequence, frame, slice, or LCU).

Still in another particular embodiment applicable to both SAO Edge and Band filtering, the derivation of the sao_band_position parameter between two components can be signaled in the bitstream and be in competition with the conventional mode in which the sao_band_position parameter value is encoded in the bitstream for all the components.

The encoding selection of SAO parameters when SAO parameters are shared between two or three color components preferably relates to coding efficiency. In other words, selecting shared SAO parameters takes advantageously into account the coding efficiency of these parameters and associated values. It is to be recalled here that the selection of the best offset in terms of rate distortion cost is the same for both Edge and Band offset filtering.

The encoding selections of offsets when these offsets are shared between two components Z and X, whatever the SAO type (Edge of Band) used is described herein below before the band center selection.

Figure 3:
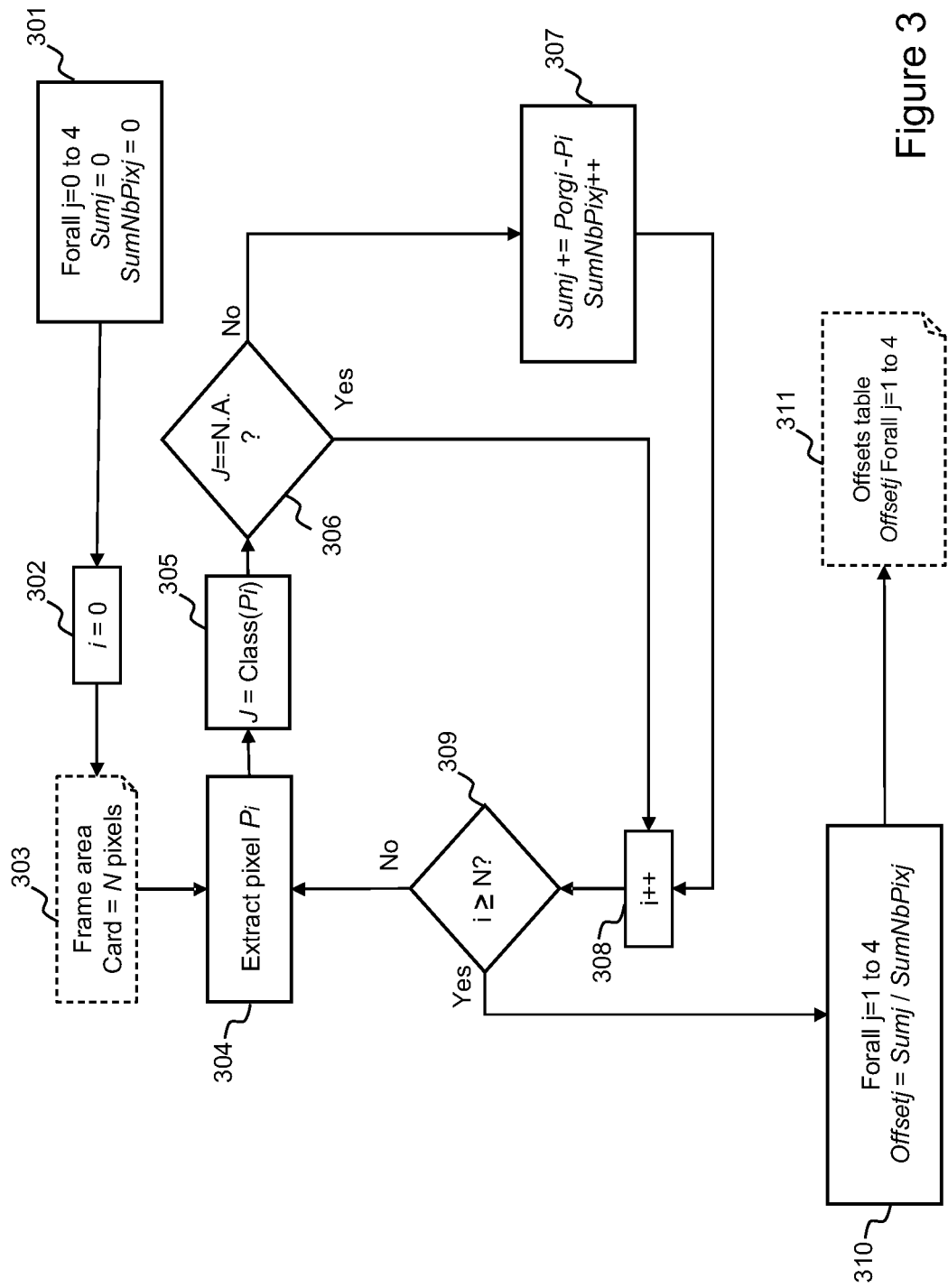
FIG. 3 is a flow chart illustrating steps of a process for determining compensation offsets for SAO Band offset of HEVC.

As described by reference to FIG. 3 illustrating the encoding process for determining an optimal offset in terms of distortion for one component, the SumXj and SumNbPixXj values related to component X and the SumZj and SumNbPixZj values related to component Z are known for all classes j. SumXj and SumZj are the sums of differences between the pixel values in the class j and their original values for respectively components X and Z. SumNbPixXj and SumNbPixZj are the number of pixels in class j for respectively X and Z components. It is assumed that the values of these four parameters have already been computed for all classes.

In the particular embodiment according to which to which an object is to get Ozj=Oxj, the optimal offset Ooptj can be determined by the following formula:

$$Ooptj=Ozj=Oxj=(SumXj+SumZj)/(SumNbPixXj+SumNbPixZj)$$

Next, as described above for processing each component independently, the encoder determines the best offset Oxj in terms of rate distortion criterion.

This consists, with the particular embodiment according to which Ozj=Oxj, in minimizing the rate distortion cost as follows:

$$J(Oxj,Ozj)=SumNbPixXj\times(Oxj\times Oxj)-SumXj\times Oxj\times 2+SumNbPix(j)\times(Oxj\times Oxj)-SumZU)\times Oxj\times 2+\lambda R(Oxj)$$

that can be simplified according to the following expression:

$$J(Oxj,Ozj)=(SumNbPixXj+SumNbPixZj)\times(Oj\times Oj)-(SumXj+SumZj)\times Oj\times 2+\lambda R(Oj)$$

In the particular embodiment according to which mirrored values are targeted to determine offsets (Ozj=−Ox(5−j)) for the Edge offset case, the optimal offset can be defined by the following formula:

$$Ooptj=Oz(5-j)=Oxj=(SumXj-SumZ(5-j))/(SumNbPixXj+SumNbPixZ(5-j))$$

Next, the encoder determines a best offset Oxj in terms of rate distortion criterion. This consists, according to the particular embodiment according to which Oz(5−j)=−Oxj, in minimizing the rate distortion cost as follows:

$$J(Oxj,OzD=SumNbPixXj\times(Oxj\times Oxj)-SumXj\times Oxj\times 2+SumNbPixZ(5-j))\times(Oz(5-j)\times Oz(5-j))-SumZ(5-j)\times Oz(5-j)\times 2+\lambda R(Oxj)$$

or $$J(Oxj,OzD=SumNbPixXj\times(Oxj\times Oxj)-SumXj\times Oxj\times 2+SumNbPixZ(5-j)\times(Oxj\times Oxj)+SumZ(5-j)\times Oxj\times 2+\lambda R(Oxj)$$

In the particular embodiment according to which Ozj=−Oxj, the optimal offset Ooptj is determined by the following formula:

$$Ooptj=(SumXj-SumZj)/(SumNbPixXj+SumNbPixZj)$$

Next, the encoder determines a best offset Oxj in terms of rate distortion criterion. This consists, according to the particular embodiment according to which Ozj=−Oxj, in minimizing the rate distortion cost as follows:

$$J(Oxj,Ozj)=SumNbPixXj\times(Oxj\times Oxj)-SumXj\times Oxj\times 2+SumNbPixZ(j)\times(Ox(j)\times Ox(j))+SumZ(j)\times Ox(j)\times 2+\lambda R(Oxj),$$

that can be simplified by the following expression:

$$J(Oxj,Ozj)=(SumNbPixXj+SumNbPixZj)\times(Oxj\times Oxj)-(SumXj-SumZj)\times Oxj\times 2+\lambda R(Oxj)$$

Figure 4:
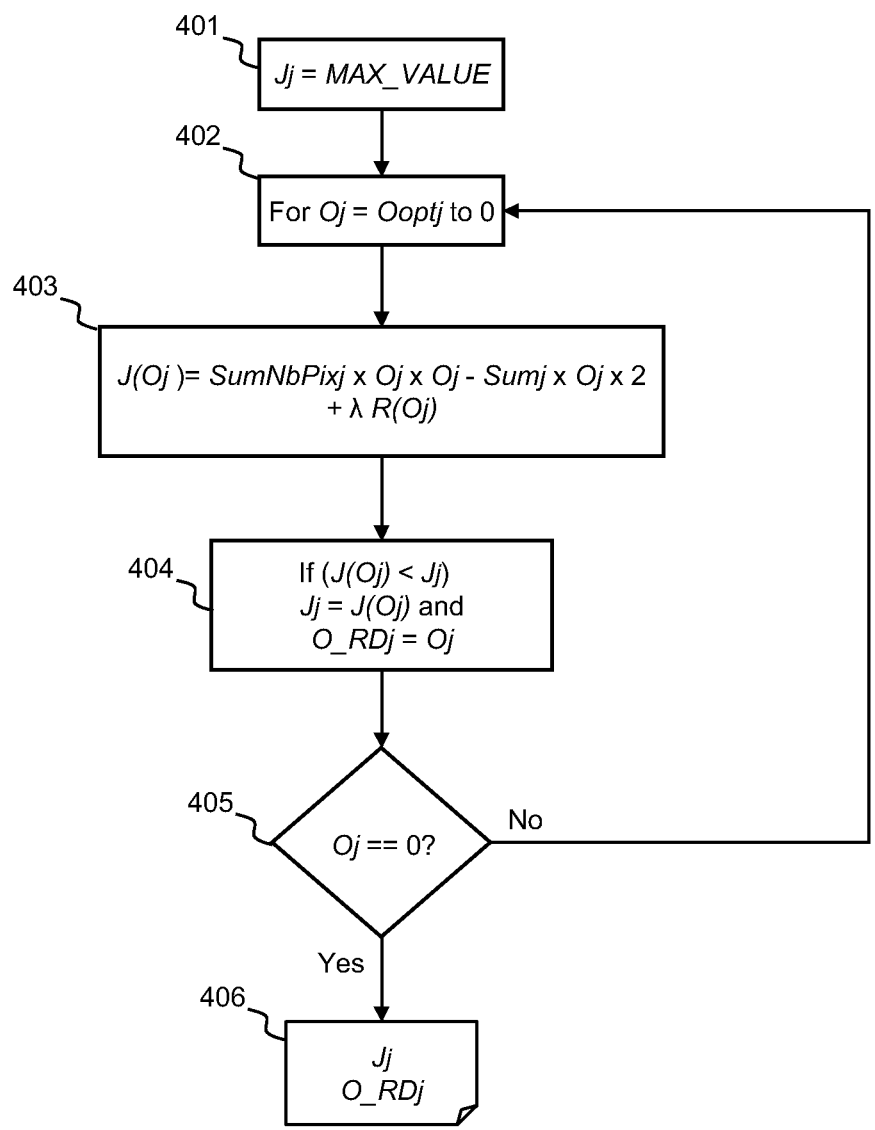
FIG. 4 is a flow chart illustrating a process to select an SAO offset from a rate-distortion point of view.

In the particular embodiment according to which Ozj=βj Oxj, the encoder determines independently an optimal OoptXj value for component X and an optimal OoptZj value for component Z. Next, the encoder determines a best offset Oxj in terms of rate distortion criterion. This consists, according to the particular embodiment Ozj=βj Oxj, in minimizing the rate distortion cost as described by reference to FIG. 4.

FIG. 20 is a flow chart illustrating steps of a method for determining an optimal offset to be used by two or three components according to a rate distortion criterion. The process illustrated in FIG. 20 is based on the one described by reference to FIG. 4. Steps 2001, 2004, 2005, and 2006 are similar to steps 401, 404, 405, and 406, respectively.

Step 2002 differs from step 402 in that the loop launched at step 2002 makes offset Oxj varying from sign(OoptXj)×max(f×OoptXj, OoptZj) to zero where f is equal to $1/\beta_j$ if $\beta_j<1$ and to $\beta_j$ otherwise.

In the generalized embodiment in which Ozj=βj Oxj, the rate distortion criterion is computed according to the following formula:

$$J(Oxj,Ozj)=SumNbPixXj\times(Oxj\times Oxj)-SumXj\times Oxj\times 2+SumNbPixZ(j)\times(\beta j\times Oxj\times \beta j\times Oxj)-SumZ(j)\times \beta j\times Oxj\times 2+\lambda R(Oxj)$$

that can be also written as follows:

$$J(Oxj,Ozj)=(SumNbPixXj+SumNbPixZ(j)\times(\beta j)\times(\beta j))\times(Oxj\times Oxj)-(SumXj+SumZ(j)\times \beta j)\times Oxj\times 2+\lambda R(Oxj)$$

In step 2003, the particular case where βj=−1 is considered the for sake of illustration.

The selection of an sao_band_position value shared between two components X and Z can be determined according to the following relationships:

$$sao\_band\_position\_Z=\beta(sao\_band\_position\_X-14)+14$$

FIG. 21 is a flow chart illustrating steps of a method for determining an SAO band position shared between two components. It is based on the process described by reference to FIG. 5. The process illustrated in FIG. 21 aims at determining the value of sao_band_position_Z associated with component Z from the value of sao_band_position_X associated with component X.

Figure 5:
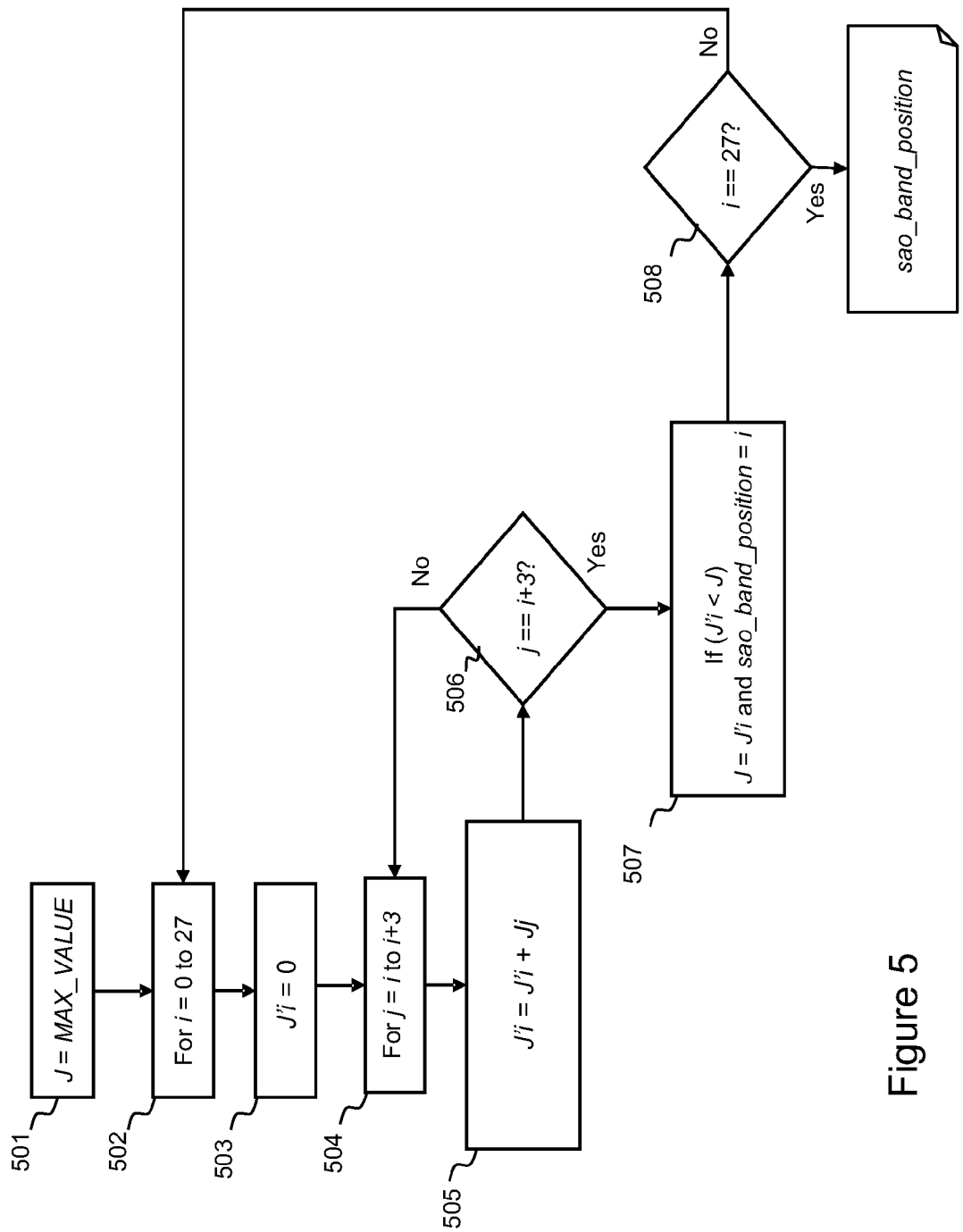
FIG. 5 is a flow chart illustrating steps of a method for determining an SAO band position for SAO Band offset of HEVC.

The main difference between the process illustrated in FIG. 21 and the one illustrated in FIG. 5 relates to module 2105 where both rate distortion values of classes associated with component Z and classes associated with component X are added together according to the following formula:

$$J'i=J'i+JZj+JXjx$$

where JZj is the rate distortion value for class j of the component Z and JXjx is the rate distortion value for class j of the component X. Moreover to select jointly the sao_band_position_Z with sao_band_position_X, the index jx is derived according the following formula:

$$sao\_band\_position\_Z=\beta(sao\_band\_position\_X-14)+14$$

Accordingly, jx is equal to β(j−14)+14

According to a second main embodiment that avoids component classification in order to reduce the decoding complexity, the pixels in an SAO class are determined as a function of a single component. The pixel positions are then used to determine the component or components which need to be filtered. Accordingly, if a pixel component is to be filtered according to that component, another component or the two other components of that pixel are filtered.

Figure 6:
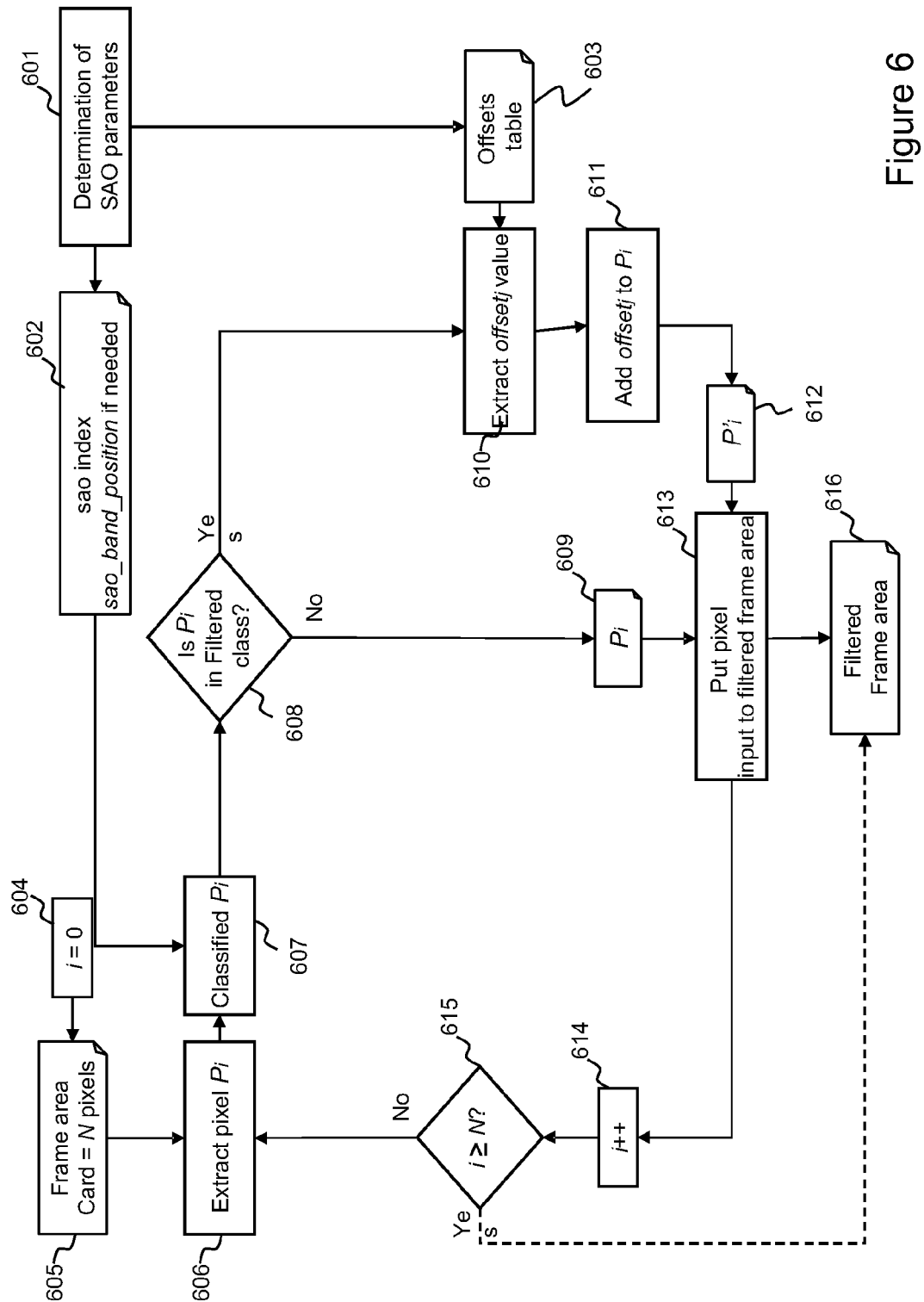
FIG. 6 is a flow chart illustrating steps of a method for filtering a frame area according to an SAO loop filter.

FIG. 22 is a flow chart illustrating steps of a method for decoding a bitstream according to a particular embodiment of the invention. The process illustrated in this figure is based on the one illustrated in FIG. 6. It aims at using the classification of component X to filter component Z.

An initial step 2201 consists in determining SAO parameters according to the processes described by reference to FIGS. 12, 13, and 14. However, according to the algorithm illustrated in FIG. 22, only the value of the sao_type_idx parameter and, if it is equal to five, the value of the sao_band_position parameter for component X are determined at step 2202 from the bitstream (not represented). Indeed, these parameters being related to the classification, they are not needed to classify component Z which is filtered according to the classification of component X.

Next, in step 2203 the four offsets associated with component X are obtained from the bitstream. Similarly, the four offsets associated with component Z are obtained from the bitstream at step 2204. It is to be noted that these offsets can be determined as a function of other offsets associated with other components and/or with another LCU as described above.

In step 2205, the counter variable i is set to the value zero. Next, the first pixel $Px_i$ of the frame area of component X (reference 2206), comprising N pixels, is extracted at step 2207. Similarly, the first pixel $Pz_i$ of the frame area of component Z (reference 2208) is extracted at step 2209. For the sake of illustration, it is admitted here that the frame area of component Z contains also N pixels (components X and Z have the same amount of pixels per frame area).

Figure 1:
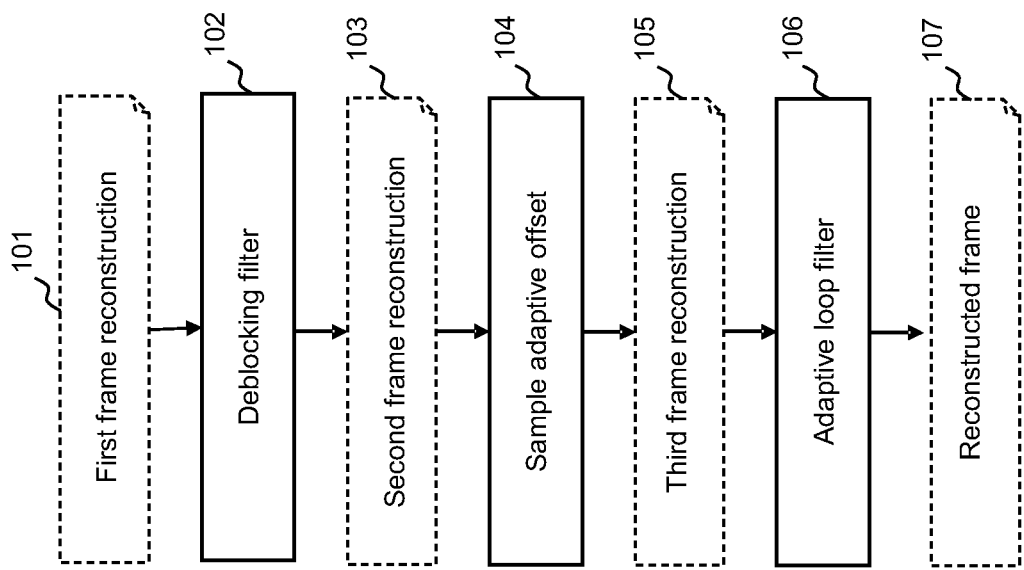
Figure 2:
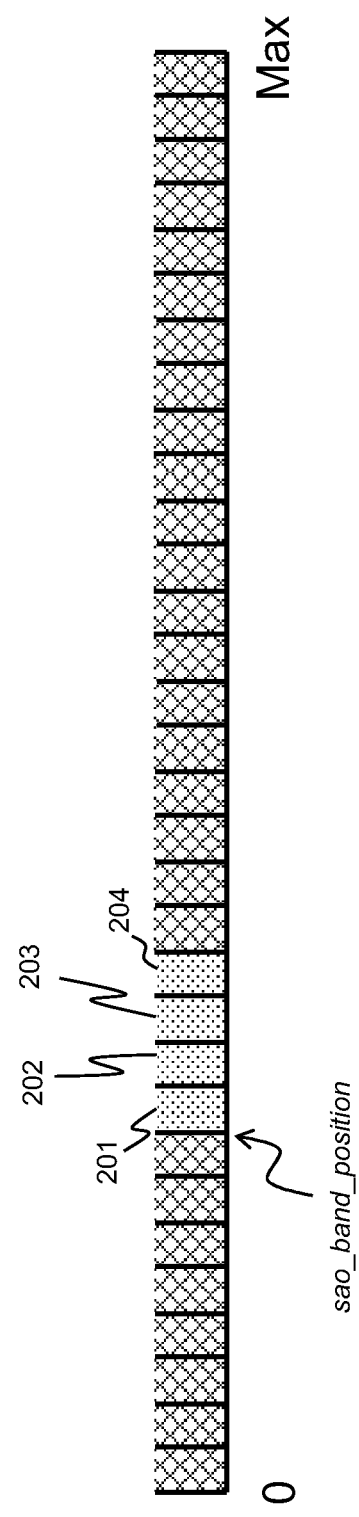

Next, in step 2210, component X of the first pixel $Px_i$ is classified according to the Edge offset classification or Band offset classification thanks to the value of the sao_type_idx_X parameter (and if needed the value of the sao_band_position_X parameter) as described previously by reference to Table 2 of the Appendix and FIG. 2, respectively.

In step 2211, a test is performed to determine whether or not component X of pixel Pxi is to be filtered (i.e. if Pxi belongs to an SAO class). If Pxi belongs to an SAO class, the related class number j is identified and the corresponding offset value is obtained at step 2212 from the offsets table associated with component X. Next, in step 2213, component X of pixel Pxi is filtered by adding the obtained offset to its value. The filtered component X of pixel Pxi is referred to as P'xi (reference 2214). Simultaneously or sequentially, the offset value associated with component Z and corresponding to class number j is obtained at step 2215 from the offsets table associated with component Z. Next, in step 2216, component Z of pixel Pzi is filtered by adding the obtained offset to its value. The filtered component Z of pixel Pzi is referred to as P'zi (reference 2217).

Next, in step 2218, the filtered components P'xi and P'zj are put in component X and component Z of the filtered frame area, referred to as 2219 and 2220, respectively. In step 2218, filtered pixels P'xi and P'zj respectively replace pixels Pxi and Pzj of the processed frames referred to as 2219 and 2220.

If Pxi does not belong to an SAO class, components Pxi and Pzj in component X and component Z of the filtered frame areas remain unchanged at steps 2221, 2222, and 2218.

Next, at step 2223, the counter variable i is incremented by one in order to apply the filter process similarly to the next pixels of the current frame area.

In step 2224, it is determined whether or not all the N pixels of the current frame area have been processed (i≥N). If yes, the filtered components X and Z of the frame area are reconstructed and can be added to the SAO reconstructed frame.

FIG. 22 illustrates the use of SAO classification of one component X to filter similarly another component Z when both components have the same number of pixels for the current frame area.

However, components of a frame area do not always have the same number of pixels. Depending on the relative number of pixels for component X, denoted Nx regarding the number of pixels for component Z, denoted Nz, two cases can be considered. Since the difference between the numbers of pixels of two different components in a frame area is typically a multiple of two, it is generally not necessary to take into account non-integer relationships between pixel component numbers.

Considering the case according to which the number of pixels of component Z is greater than the number of pixels of component X (Nx<Nz), the algorithm described by reference to FIG. 22 can be easily adapted by considering that Pzi is a group of Nz/Nx pixels. Accordingly, when an offset OffsetZi is added to a group of pixels Pzi, this offset is applied to all pixels of the group of pixels Pzi. Moreover, in a particular embodiment, it can be considered that the offset OffsetZi is a group of offsets of the same size as the group of pixels Pzi.

Considering the case according to which the number of pixels of component X is greater than the number of pixels of component Z (Nx>Nz), several embodiments can be considered. In such a case, steps 2216 and 2218 described by reference to FIG. 22 need to take into account the relationship between the number of pixels of component X and the number of pixels of component Z. In FIG. 22, Pzi is changed by Pz(i/Nx).

In a first particular embodiment, the offset OffsetZi is added to the group Pz(i/Nx) only if Pxi have been filtered at least once.

According to another particular embodiment, step 2218 of FIG. 22 takes into account the number of times that Pxi have been filtered. If it is greater than 2×Nx/Nz then OffsetZi is added to Pz(i/Nx).

Still according to a particular embodiment, step 2218 receives Nx/Nz times, Pz(i/Nx) or P'z(i/Nx) and it computes the average in order to produce the pixel value put in filtered frame area for component Z (2220).

FIG. 23 illustrates the use of SAO classification of one component X to similarly filter another component Z.

For the sake of illustration, the greyed pixels of the block 2301 represent pixels filtered for an SAO loop filter of type i of the current class j for the component X according to the current implementation HEVC. Similarly, the black pixels of the block 2302 represent pixels filtered for an SAO loop filter of type i of the current class j for the component Z according to the current HEVC specifications.

Therefore, as illustrated in FIG. 23, the greyed pixels in component X and the black pixels in component Z are not always at the same position considering the current HEVC specifications.

Still for the sake of illustration, the greyed pixels of the block 2303 represent pixels filtered for an SAO loop filter of type i of the current class j for the component X according to the current implementation HEVC. However, the blackened pixels of the block 2304 represent pixels filtered for an SAO loop filter for the component Z according to the classification of component X (block 2303). Accordingly, the greyed pixels and the blackened pixels are located at the same positions. This results of the use of only one classification for both components.

It is to be noted that both main embodiments can be combined to optimize coding efficiency and decoding complexity.

Although the present invention has been described hereinabove with reference to specific embodiments, the present invention is not limited to the specific embodiments, and modifications will be apparent to a skilled person in the art which lie within the scope of the present invention. In particular, while the previous description refers to YUV components, for the sake of illustration, other schemes like RGB (Red, Green and Blue components) can be used.

For example, while the previous embodiments have been described in relation to pixels of an image and their corresponding pixel values, it will be appreciated that, within the context of the invention, a group of pixels may be considered together with a corresponding group pixel value. A sample may thus correspond to one or more pixels of an image.

Further aspects of the present invention are set out below.

According to a first further aspect of the invention there is provided a method of encoding at least a part of an image comprising a plurality of samples, each sample comprising at least two components, the encoded image comprising at least one filtering parameter, the method comprising encoding a first and a second component of at least one sample of the image to provide at least one encoded sample;

decoding the at least one encoded sample;

computing the at least one filtering parameter as a function of the difference between at least one component of the at least one sample of the image and the at least one corresponding component of the at least one corresponding decoded sample, the at least one filtering parameter being computed so as to be used in a loop filter to filter independently at least a first and a second component of a decoded sample.

By taking into account the interdependencies between components, the invention makes it possible to improve the coding efficiency of SAO, to reduce the memory buffer needed to store SAO parameters, and to reduce the complexity of the classification.

In an embodiment the at least one filtering parameter is determined as a function of a plurality of estimated filtering parameters so that the efficiency of coding the at least one filtering parameter is an optimum.

In an embodiment the at least one filtering parameter is determined as a function of the differences between at least a component of samples of a part of the image and the at least one corresponding component of the corresponding decoded samples, of the number of samples of the at least one component in the part of the image, and of values of two components of the samples of the part of the image.

In an embodiment the at least one filtering parameter is determined as a function of a first filtering parameter computed as a function of the difference between a first component of the at least one sample of the image and the corresponding first component of the at least one corresponding decoded sample and of a second filtering parameter computed as a function of the difference between a second component of the at least one sample of the image and the corresponding second component of the at least one corresponding decoded sample.

In an embodiment the first and second filtering parameters are computed as a function of a plurality of samples of a part of the image.

In an embodiment the at least one filtering parameter comprises at least one offset to be added to a sample component to be filtered.

In an embodiment the at least one filtering parameter further comprises at least one weighting factor for weighting the at least one offset.

In an embodiment the at least one filtering parameter further comprises at least one position of a band which defines at least one class of sample components to be filtered.

In an embodiment the method further comprises a step of determining the at least one position as a function of different rate distortion values estimated for different components.

Still in an embodiment the at least one filtering parameter further comprises at least one flag associated with at least a first component of a first sample, the at least one flag being indicative of a reference to at least one filtering parameter associated with at least a second component of a second sample, for filtering the at least a first component.

In an embodiment the at least one filtering parameter further comprises at least one flag associated with at least a first component of a first sample, the at least one flag being indicative of a reference to at least one filtering parameter associated with at least a second component of a second sample, for filtering a plurality of components of the first sample.

According to a second further aspect of the invention there is provided a method of decoding at least a part of an image comprising a plurality of samples, each sample comprising at least two components, the encoded image comprising at least one filtering parameter, the method comprising decoding a first and a second component of at least one encoded sample to provide a first and a second component of at least one reconstructed sample;

decoding the at least one filtering parameter;

filtering the at least one reconstructed sample in a loop filter, the filtering of the first component and of the second component of the at least one reconstructed sample being based on at least one common filtering parameter of the decoded at least one filtering parameter.

By taking into account the interdependencies between components, the invention makes it possible to improve the coding efficiency of SAO, to reduce the memory buffer needed to store SAO parameters, and to reduce the complexity of the classification.

In an embodiment the method further comprises a step of obtaining a least one flag indicatives of a reference to the at least one filtering parameter.

In an embodiment the method further comprises a step of analysing the obtained at least one flag and, in response to the analysis, obtaining the at least one common filtering parameter.

Still in an embodiment the method further comprises a step of obtaining at least another flag indicatives of a reference to at least one filtering parameter and a step of analysing the obtained at least another flag, the step of obtaining a least one flag being carried out in response to the step of analysing the obtained at least another flag.

In an embodiment the method further comprises a step of computing a filtering parameter to be used for filtering at least the first component of the at least one reconstructed sample as a function of the decoded at least one filtering parameter.

In an embodiment the method further comprises a step of computing a filtering parameter to be used for filtering the first and second components of the at least one reconstructed sample as a function of the decoded at least one filtering parameter.

Still in an embodiment the method further comprises a step of obtaining at least one weighting factor, the computed filtering parameter being based on the obtained at least one weighting factor.

In an embodiment the method further comprises a step of decoding the at least one weighting factor, the at least one weighting factor being received along with the part of the image to be decoded.

In an embodiment the common filtering parameter comprises at least one offset value to be added to at least the first component of the at least one reconstructed sample.

In an embodiment the common filtering parameter comprises at least one position of a band which defines at least one class of sample components to be filtered.

Still in an embodiment the method further comprises a step of obtaining at least one weighting factor to applied on the at least one position of the band for filtering at least the first component of the at least one reconstructed sample.

According to a third further aspect of the invention there is provided a method of encoding at least a part of an image comprising a plurality of samples, each sample comprising at least two components, the encoded image comprising at least one filtering parameter, the method comprising encoding a first and a second component of at least one sample of the image to provide at least one encoded sample;

decoding the at least one encoded sample;

computing the at least one filtering parameter as a function of the difference between a component of the at least one sample of the image and the corresponding component of the at least one decoded sample, the at least one filtering parameter being computed so as to be used in a loop filter to filter independently at least a first and a second component of a decoded sample.

By taking into account the interdependencies between components, the invention makes it possible to improve the coding efficiency of SAO, to reduce the memory buffer needed to store SAO parameters, and to reduce the complexity of the classification.

According to a fourth further aspect of the invention there is provided a method of decoding at least a part of an image comprising a plurality of samples, each sample comprising at least two components, the encoded image comprising at least one filtering parameter, the method comprising decoding a first component of a first encoded sample and a second component of a second encoded sample to provide a first component of a first reconstructed sample and a second component of a second reconstructed sample;

decoding the at least one filtering parameter;

filtering reconstructed samples in a loop filter, the filtering of the first component of the first reconstructed sample and of the second component of the second reconstructed sample being based on at least one common filtering parameter of the decoded at least one filtering parameter.

By taking into account the interdependencies between components, the invention makes it possible to improve the coding efficiency of SAO, to reduce the memory buffer needed to store SAO parameters, and to reduce the complexity of the classification.

In an embodiment the method further comprises a step of computing a filtering parameter to be used for filtering the first component of the at least one reconstructed sample as a function of a filtering parameter to be used for filtering the second component of the at least one reconstructed sample.

In an embodiment a first plurality of filtering parameters are associated with the first component of the first reconstructed sample and a second plurality of filtering parameters are associated with the second component of the second reconstructed sample, the filtering parameter values of the first plurality of filtering parameters being equal to the filtering parameter values of the second plurality of filtering parameters and the filtering parameter values of the first plurality of filtering parameters being in inverse order to the order of the filtering parameter values of the second plurality of filtering parameters.

In another embodiment a first plurality of filtering parameters are associated with the first component of the first reconstructed sample and a second plurality of filtering parameters are associated with the second component of the second reconstructed sample, the filtering parameter values of the first plurality of filtering parameters being equal to the filtering parameter values of the second plurality of filtering parameters multiplied by a predetermined weighting factor.

According to a fifth further aspect of the invention there is provided a computer program product for a programmable apparatus, the computer program product comprising a sequence of instructions for implementing each step of the method embodying one of the first to fourth further aspects described above when loaded into and executed by the programmable apparatus.

By taking into account the interdependencies between components, the invention makes it possible to improve the coding efficiency of SAO, to reduce the memory buffer needed to store SAO parameters, and to reduce the complexity of the classification.

According to a sixth further aspect of the invention there is provided a computer-readable storage medium storing instructions of a computer program for implementing each step of the method embodying one of the first to fourth further aspects described above.

By taking into account the interdependencies between components, the invention makes it possible to improve the coding efficiency of SAO, to reduce the memory buffer needed to store SAO parameters, and to reduce the complexity of the classification.

According to a seventh further aspect of the invention there is provided an encoding device for encoding at least a part of an image comprising a plurality of samples, each sample comprising at least two components, the encoded image comprising at least one filtering parameter, the encoding device comprising means for encoding a first and a second component of at least one sample of the image to provide at least one encoded sample;

means for decoding the at least one encoded sample;

means for computing the at least one filtering parameter as a function of the difference between at least one component of the at least one sample of the image and the at least one corresponding component of the at least one corresponding decoded sample, the at least one filtering parameter being computed so as to be used in a loop filter to filter independently at least a first and a second component of a decoded sample.

By taking into account the interdependencies between components, the invention makes it possible to improve the coding efficiency of SAO, to reduce the memory buffer needed to store SAO parameters, and to reduce the complexity of the classification.

In an embodiment the device further comprises means for encoding flags, the at least one filtering parameter further comprising at least one flag associated with at least a first component of a first sample, the at least one flag being indicative of a reference to at least one filtering parameter associated with at least a second component of a second sample, for filtering the at least a first component.

In another embodiment the device further comprises means for encoding flags, the at least one filtering parameter further comprising at least one flag associated with at least a first component of a first sample, the at least one flag being indicative of a reference to at least one filtering parameter associated with at least a second component of a second sample, for filtering a plurality of components of the first sample.

According to an eighth further aspect of the invention there is provided a decoding device for decoding at least a part of an image comprising a plurality of samples, each sample comprising at least two components, the encoded image comprising at least one filtering parameter, the device comprising means for decoding a first and a second component of at least one encoded sample to provide a first and a second component of at least one reconstructed sample;

means for decoding the at least one filtering parameter;

means for filtering the at least one reconstructed sample in a loop filter, the filtering of the first component and of the second component of the at least one reconstructed sample being based on at least one common filtering parameter of the decoded at least one filtering parameter.

By taking into account the interdependencies between components, the invention makes it possible to improve the coding efficiency of SAO, to reduce the memory buffer needed to store SAO parameters, and to reduce the complexity of the classification.

In an embodiment the device further comprises means for obtaining a least one flag indicatives of a reference to the at least one filtering parameter, means for obtaining at least another flag indicatives of a reference to at least one filtering parameter, and means for analysing the obtained at least another flag, the means for obtaining a least one flag being responsive to the means for analysing the obtained at least another flag.

In an embodiment the device further comprises means for computing a filtering parameter to be used for filtering at least the first component of the at least one reconstructed sample as a function of the decoded at least one filtering parameter.

Still in an embodiment the device further comprises means for computing a filtering parameter to be used for filtering the first and second components of the at least one reconstructed sample as a function of the decoded at least one filtering parameter.

According to a ninth further aspect of the invention there is provided an encoding device for encoding at least a part of an image comprising a plurality of samples, each sample comprising at least two components, the encoded image comprising at least one filtering parameter, the device comprising means for encoding a first and a second component of at least one sample of the image to provide at least one encoded sample;

means for decoding the at least one encoded sample;

means for computing the at least one filtering parameter as a function of the difference between a component of the at least one sample of the image and the corresponding component of the at least one decoded sample, the at least one filtering parameter being computed so as to be used in a loop filter to filter independently at least a first and a second component of a decoded sample.

By taking into account the interdependencies between components, the invention makes it possible to improve the coding efficiency of SAO, to reduce the memory buffer needed to store SAO parameters, and to reduce the complexity of the classification.

According to a tenth further aspect of the invention there is provided a decoding device for decoding at least a part of an image comprising a plurality of samples, each sample comprising at least two components, the encoded image comprising at least one filtering parameter, the device comprising means for decoding a first component of a first encoded sample and a second component of a second encoded sample to provide a first component of a first reconstructed sample and a second component of a second reconstructed sample;

means for decoding the at least one filtering parameter;

means for filtering reconstructed samples in a loop filter, the filtering of the first component of the first reconstructed sample and of the second component of the second reconstructed sample being based on at least one common filtering parameter of the decoded at least one filtering parameter.

By taking into account the interdependencies between components, the invention makes it possible to improve the coding efficiency of SAO, to reduce the memory buffer needed to store SAO parameters, and to reduce the complexity of the classification.

In an embodiment the device further comprises means for computing filtering parameters, wherein a first plurality of filtering parameters are associated with the first component of the first reconstructed sample and a second plurality of filtering parameters are associated with the second component of the second reconstructed sample, the filtering parameter values of the first plurality of filtering parameters being equal to the filtering parameter values of the second plurality of filtering parameters and the filtering parameter values of the first plurality of filtering parameters being in inverse order to the order of the filtering parameter values of the second plurality of filtering parameters.

In another embodiment the device further comprises means for computing filtering parameters, wherein a first plurality of filtering parameters are associated with the first component of the first reconstructed sample and a second plurality of filtering parameters are associated with the second component of the second reconstructed sample, the filtering parameter values of the first plurality of filtering parameters being equal to the filtering parameter values of the second plurality of filtering parameters multiplied by a predetermined weighting factor.

Many further modifications and variations will suggest themselves to those versed in the art upon making reference to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

APPENDIX

TABLE 1

| sao type idx | SAO type | SAO type meaning |
|---|---|---|
| 0 | none | No SAO filtering is applied on the frame area |
| 1 | edge | 1D 0 degree |
| 2 | edge | 1D 90 degree |
| 3 | edge | 1D 135 degree |
| 4 | edge | 1D 45 degree |
| 5 | band | Band offset with band position |

TABLE 2

| Category (J) | Conditions | Offset |
|---|---|---|
| 1 | $C < Cn_1$ and $C < Cn_2$ | $+O_1$ |
| 2 | ($C < Cn_1$ and $C == Cn_2$) or ($C < Cn_2$ and $C == Cn_1$) | $+O_2$ |
| 3 | ($C > Cn_1$ and $C == Cn_2$) or ($C > Cn_2$ and $C == Cn_1$) | $-O_3$ |
| 4 | $C > Cn_1$ and $C > Cn_2$ | $-O_4$ |
| N.A. | None of the above | N.A. |

The invention claimed is:

1. A method of encoding at least a part of an image comprising a plurality of samples and at least one filtering parameter, each sample comprising at least two components, the method comprising:
   encoding a first chroma component and a second chroma component of at least one sample of the image to provide at least one encoded sample;
   decoding the at least one encoded sample to produce, for each said sample that is encoded and decoded, a corresponding decoded sample having components corresponding respectively to said components of the sample concerned; and
   determining the at least one filtering parameter based on a difference between at least one component of the at least one sample of the image and the at least one corresponding component of the at least one corresponding decoded sample, the at least one filtering parameter being determined so as to be used as a filtering parameter for performing sample adaptive offset loop filtering on said at least one corresponding component of a decoded sample;
   wherein when the sample adaptive offset loop filtering is of a first type at least one filtering parameter is determined to be used as a common filtering parameter for performing filtering on both the first and second chroma components, the common filtering parameter indicating a classification for the filtering of the first type, the first type of sample adaptive offset loop filtering being one of edge-type filtering and band-type filtering, and when the sample adaptive offset loop filtering is of a second type, different from the first type, different filtering parameters are determined to be used as dedicated filtering parameters for indicating a classification for filtering the first and second chroma components respectively, the second type of sample adaptive offset loop filtering being the other of edge-type filtering and band-type filtering.

2. A method according to claim 1, wherein the first and second chroma components are U and V chroma components respectively.

3. A method according to claim 1, wherein the or one said filtering parameter is a flag indicating, for a given sample, that one or more filtering parameters used for filtering another sample are to be used to provide corresponding filtering parameters for filtering the given sample.

4. A method according to claim 1, wherein one said filtering parameter is a flag indicating, for a given sample in a first said part of the image, that one or more filtering parameters used for filtering another sample in a second said part of the image, different from said first part, are to be used to provide corresponding filtering parameters for filtering the given sample.

5. A method according to claim 1, wherein one said filtering parameter is a left flag indicating, for a given sample in a first said part of the image, that one or more filtering parameters used for filtering another sample in a second said part of the image, to the immediate left of said first part, are to be used to provide corresponding filtering parameters for filtering the given sample, and another said filtering parameter is an upper flag indicating, for said given sample, that one or more filtering parameters used for filtering another sample in a third said part of the image, immediately above said first part, are to be used to provide corresponding filtering parameters for filtering the given sample.

6. A method of decoding at least a part of an image comprising a plurality of samples and at least one filtering parameter, each sample comprising at least two components, the method comprising:
   decoding a first chroma component and a second chroma component of at least one encoded sample to provide a first chroma component and a second chroma component of at least one reconstructed sample;
   decoding the at least one filtering parameter; and
   performing sample adaptive offset loop filtering on the at least one reconstructed sample, wherein when the sample adaptive offset loop filtering is of a first type at least one decoded filtering parameter is used as a common filtering parameter for performing filtering of the first type on both the first chroma component and the second chroma component of the at least one reconstructed sample, the common filtering parameter indicating a classification for the filtering of the first type, the first type of sample adaptive offset loop filtering being one of edge-type filtering and band-type filtering, and when the sample adaptive offset loop filtering is of a second type, different from the first type, different decoded filtering parameters are used as dedicated filtering parameters for indicating a classification for filtering the first and second chroma components respectively, the second type of sample adaptive offset loop filtering being the other of edge-type filtering and band-type filtering.

7. A method according to claim 6, wherein the first and second chroma components are U and V chroma components respectively.

8. A method according to claim 6, wherein the or one said filtering parameter is a flag indicating, for a given reconstructed sample, that one or more filtering parameters used for filtering another reconstructed sample are to be used to provide corresponding filtering parameters for filtering the given reconstructed sample.

9. A method according to claim 6, wherein one said filtering parameter is a flag indicating, for a given reconstructed sample in a first said part of the image, that one or more filtering parameters used for filtering another reconstructed sample in a second said part of the image, different from the first said part, are to be used to provide corresponding filtering parameters for filtering the given reconstructed sample.

10. A method according to claim 6, wherein one said filtering parameter is a left flag indicating, for a given reconstructed sample in a first said part of the image, that one or more filtering parameters used for filtering another reconstructed sample in a second said part of the image, to the immediate left of the first said part, are to be used to provide corresponding filtering parameters for filtering the given reconstructed sample, and another said filtering parameter is an upper flag indicating, for said given reconstructed sample, that one or more filtering parameters used for filtering another reconstructed sample in a third said part of the image, immediately above said first part, are to be used to provide corresponding filtering parameters for filtering the given reconstructed sample.

11. A non-transitory computer-readable storage medium storing instructions of a computer program for implementing a method of encoding at least a part of an image comprising a plurality of samples and at least one filtering parameter, each sample comprising at least two components, the method comprising:
  encoding a first chroma component and a second chroma component of at least one sample of the image to provide at least one encoded sample;
  decoding the at least one encoded sample to produce, for each said sample that is encoded and decoded, a corresponding decoded sample having components corresponding respectively to said components of the sample concerned; and
  determining the at least one filtering parameter based on a difference between at least one component of the at least one sample of the image and the at least one corresponding component of the at least one corresponding decoded sample, the at least one filtering parameter being determined so as to be used as a filtering parameter for performing sample adaptive offset loop filtering on said at least one corresponding component of a decoded sample;
  wherein the sample adaptive offset loop filtering is of a first type at least one filtering parameter is determined to be used as a common filtering parameter for performing filtering on both the first and second chroma components, the common filtering parameter indicating a classification for the filtering of the first type, the first type of sample adaptive offset loop filtering being one of edge-type filtering and band-type filtering, and when the sample adaptive offset loop filtering is of a second type, different from the first type, different filtering parameters are determined to be used as dedicated filtering parameters for indicating a classification for filtering the first and second chroma components respectively, the second type of sample adaptive offset loop filtering being the other of edge-type filtering and band-type filtering.

12. A non-transitory computer-readable storage medium storing instructions of a computer program for implementing a method of decoding at least a part of an image comprising a plurality of samples and at least one filtering parameter, each sample comprising at least two components, the method comprising:
  decoding a first chroma component and a second chroma component of at least one encoded sample to provide a first chroma component and a second chroma component of at least one reconstructed sample;
  decoding the at least one filtering parameter; and
  performing sample adaptive offset loop filtering on the at least one reconstructed sample,
  wherein when the sample adaptive offset loop filtering is of a first type at least one decoded filtering parameter is used as a common filtering parameter for performing filtering of the first type on both the first chroma component and the second chroma component of the at least one reconstructed sample, the common filtering parameter indicating a classification for the filtering of the first type, the first type of sample adaptive offset loop filtering being one of edge-type filtering and band-type filtering, and when the sample adaptive offset loop filtering is of a second type, different from the first type, different decoded filtering parameters are used as dedicated filtering parameters for indicating a classification for filtering the first and second chroma components respectively, the second type of sample adaptive offset loop filtering being the other of edge-type filtering and band-type filtering.

13. An encoding device for encoding at least a part of an image comprising a plurality of samples and at least one filtering parameter, each sample comprising at least two components, the encoding device comprising:
  an encoding unit which encodes a first chroma component and a second chroma component of at least one sample of the image to provide at least one encoded sample;
  a decoding unit which decodes the at least one encoded sample to produce, for each said sample that is encoded and decoded, a corresponding decoded sample having components corresponding respectively to said components of the sample concerned; and
  a determining unit which determines the at least one filtering parameter based on a difference between at least one component of the at least one sample of the image and the at least one corresponding component of the at least one corresponding decoded sample, the at least one filtering parameter being determined so as to be used as a filtering parameter for performing sample adaptive offset loop filtering on said at least one corresponding component of a decoded sample;
  wherein the determining unit is operable, when the sample adaptive offset loop filtering is of a first type, to determine at least one filtering parameter to be used as a common filtering parameter for performing filtering of the first type on both the first and second chroma components, the common filtering parameter indicating a classification for the filtering of the first type, the first type of sample adaptive offset loop filtering being one of edge-type filtering and band-type filtering, and is further operable, when the sample adaptive offset loop filtering is of a second type, different from the first type, to determine different filtering parameters to be used as dedicated filtering parameters for indicating a classification for filtering the first and second chroma components respectively, the second type of sample adaptive offset loop filtering being the other of edge-type filtering and band-type filtering.

14. A decoding device for decoding at least a part of an image comprising a plurality of samples and at least one filtering parameter, each sample comprising at least two components, the decoding device comprising:
  a sample decoding unit which decodes a first chroma component and a second chroma component of at least one encoded sample to provide a first chroma component and a second chroma component of at least one reconstructed sample;

a parameter decoding unit which decodes the at least one filtering parameter; and a filtering unit which performs sample adaptive offset loop filtering on the at least one reconstructed sample;

wherein the filtering unit is operable, when the sample adaptive offset loop filtering is of a first type, to use at least one decoded filtering parameter as a common filtering parameter for performing filtering of the first type on both the first and second chroma components, the common filtering parameter indicating a classification for the filtering of the first type, the first type of sample adaptive offset loop filtering being one of edge-type filtering and band-type filtering, and is further operable, when the sample adaptive offset loop filtering is of a second type, different from the first type, to use different decoded filtering parameters as dedicated filtering parameters for indicating a classification for filtering the first and second chroma components respectively, the second type of sample adaptive offset loop filtering being the other of edge-type filtering and band-type filtering.

15. A device according to claim 14, wherein the first and second chroma components are U and V chroma components respectively.

16. A device according to claim 14, wherein the or one said filtering parameter is a flag indicating, for a given reconstructed sample, that one or more filtering parameters used for filtering another reconstructed sample are to be used to provide corresponding filtering parameters for filtering the given reconstructed sample.

17. A device according to claim 14, wherein one said filtering parameter is a flag indicating, for a given reconstructed sample in a first said part of the image, that one or more filtering parameters used for filtering another reconstructed sample in a second said part of the image, different from the first said part, are to be used to provide corresponding filtering parameters for filtering the given reconstructed sample.

18. A device according to claim 14, wherein one said filtering parameter is a left flag indicating, for a given reconstructed sample in a first said part of the image, that one or more filtering parameters used for filtering another reconstructed sample in a second said part of the image, to the immediate left of the first said part, are to be used to provide corresponding filtering parameters for filtering the given reconstructed sample, and another said filtering parameter is an upper flag indicating, for said given reconstructed sample, that one or more filtering parameters used for filtering another reconstructed sample in a third said part of the image, immediately above said first part, are to be used to provide corresponding filtering parameters for filtering the given reconstructed sample.

* * * * *